US010360374B2

(12) United States Patent
Basak et al.

(10) Patent No.: US 10,360,374 B2
(45) Date of Patent: Jul. 23, 2019

(54) TECHNIQUES FOR CONTROL FLOW PROTECTION

(71) Applicant: INTEL CORPORATION, Santa Clara, CA (US)

(72) Inventors: Abhishek Basak, Hillsboro, OR (US); Ravi L. Sahita, Portland, OR (US); Vedvyas Shanbhogue, Austin, TX (US)

(73) Assignee: INTEL CORPORATION, Santa Clara, CA (US)

( * ) Notice: Subject to any disclaimer, the term of this patent is extended or adjusted under 35 U.S.C. 154(b) by 208 days.

(21) Appl. No.: 15/605,573

(22) Filed: May 25, 2017

(65) Prior Publication Data
US 2018/0341767 A1 Nov. 29, 2018

(51) Int. Cl.
G06F 21/00 (2013.01)
G06F 21/52 (2013.01)
G06F 12/06 (2006.01)

(52) U.S. Cl.
CPC ............. *G06F 21/52* (2013.01); *G06F 12/06* (2013.01); *G06F 2212/1008* (2013.01); *G06F 2212/1052* (2013.01); *G06F 2212/154* (2013.01); *G06F 2221/033* (2013.01)

(58) Field of Classification Search
CPC ...................................... G06F 21/52
USPC ........................................... 726/22
See application file for complete search history.

(56) References Cited

U.S. PATENT DOCUMENTS

| 6,349,383 B1* | 2/2002 | Col ............... G06F 9/3004 712/202 |
| 10,157,268 B2* | 12/2018 | Rabet ............... G06F 21/00 |
| 2018/0004531 A1* | 1/2018 | Chen ............... G06F 3/0604 |

\* cited by examiner

Primary Examiner — Longbit Chai

(57) ABSTRACT

Various embodiments are generally directed to techniques for control flow protection with minimal performance overhead, such as by utilizing one or more micro-architectural optimizations to implement a shadow stack (SS) to verify a return address before returning from a function call, for instance. Some embodiments are particularly directed to a computing platform, such as an internet of things (IoT) platform, that overlaps or parallelizes one or more SS access operations with one or more data stack (DS) access operations.

23 Claims, 14 Drawing Sheets

200

400

500

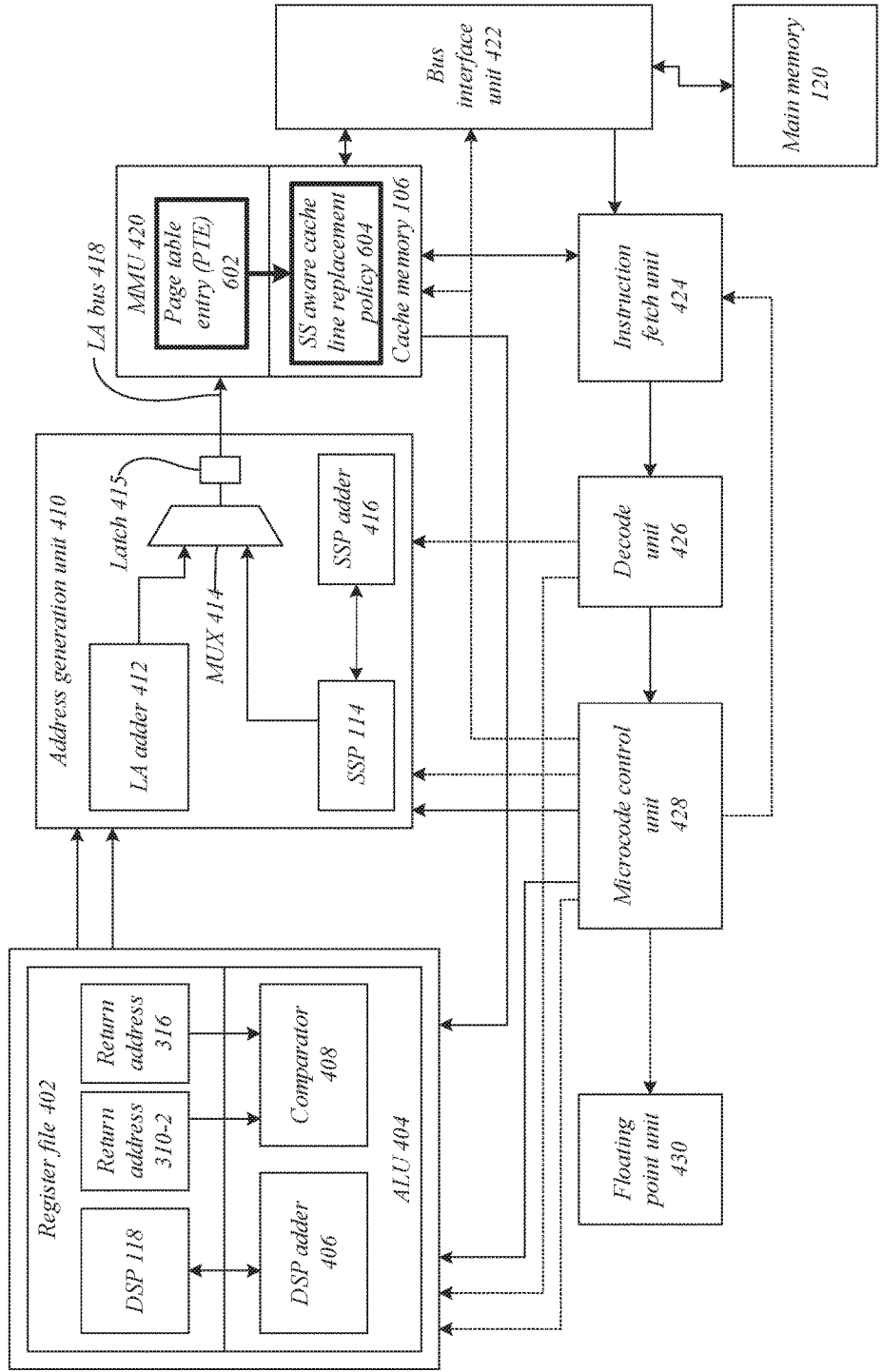

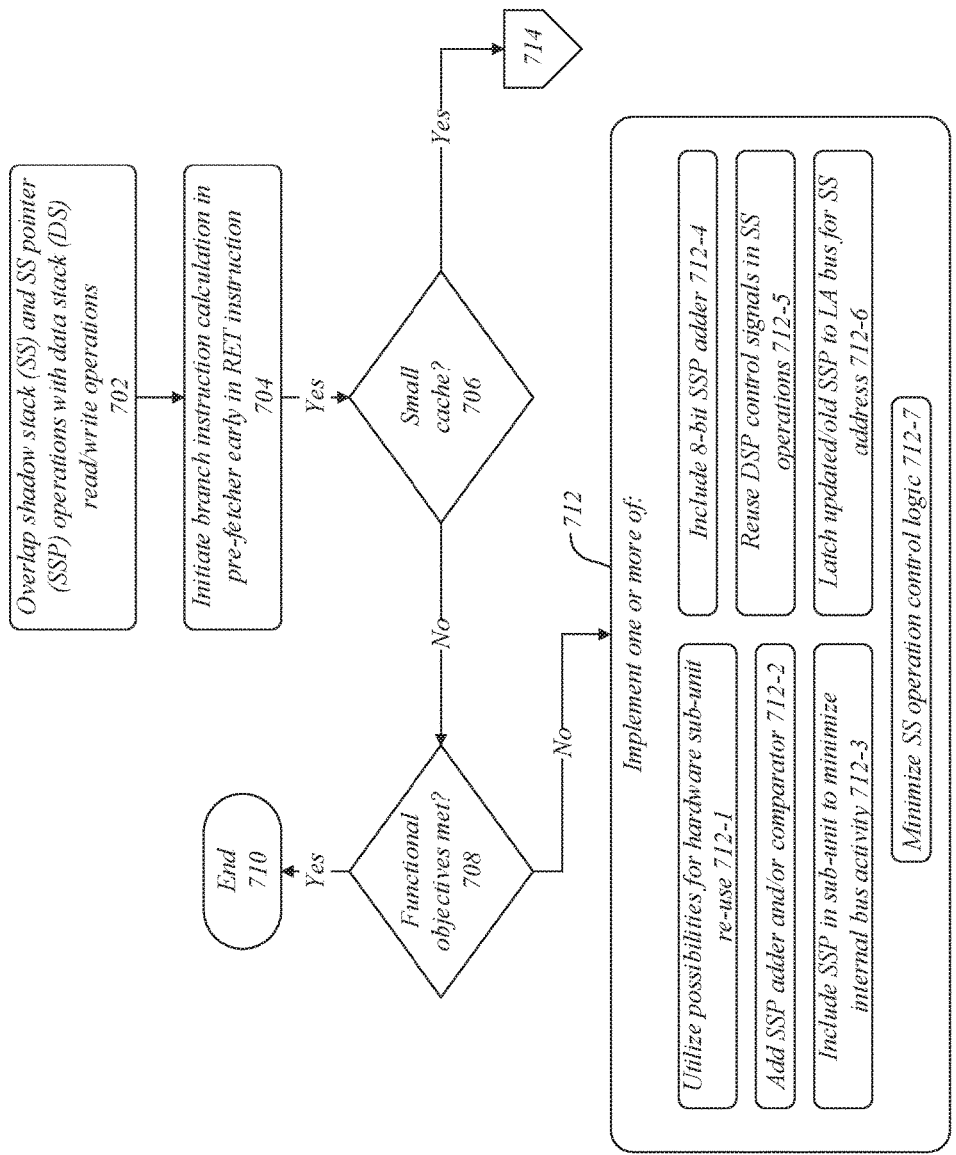

```
Write a return address onto a data stack (DS) at a location identified by a DS pointer (DSP)
value within a first instruction execution cycle and in response to a call instruction (CALL)
802
```

```
Calculate a shadow stack (SS) memory address based on an SS pointer (SSP) value within the
first instruction execution cycle and in response to the CALL
804
```

```
Write the return address onto the SS at the SS memory address generated within the first
instruction execution cycle within a second instruction execution cycle and in response to the
CALL
806
```

Read a first return address from a data stack (DS) at a location identified by a DS pointer (DSP) value within a first instruction execution cycle and in response to a return instruction (RET)
902

Calculate a shadow stack (SS) memory address based on an SS pointer (SSP) value within the first instruction execution cycle and in response to the RET
904

Read a second return address from the SS at the SS memory address generated within the first instruction execution cycle within a second instruction execution cycle and in response to the RET
906

Fetch an instruction from the first return address within the second instruction execution cycle
908

*FIG. 10*

Storage Medium 1000

Computer Executable
Instructions for 800

Computer Executable
Instructions for 900

TECHNIQUES FOR CONTROL FLOW PROTECTION

BACKGROUND

In computer science, control flow may refer to the order in which individual statements, instructions, or function calls of a program created using imperative programming are executed or evaluated. Imperative programming can be a programming paradigm that uses statements that change a program's state. Typically, within an imperative programming language, a control flow statement is a statement which execution results in a choice being made as to which of two or more paths to follow. In various embodiments, programs created within imperative programming are vulnerable to control flow hijacking, such as via return oriented programming (ROP) attacks.

BRIEF DESCRIPTION OF THE DRAWINGS

FIG. 6 illustrates an embodiment of a sixth operating environment.
FIGS. 7A-7C illustrate an embodiment of a first logic flow
FIG. 8 illustrates an embodiment of a second logic flow.
FIG. 9 illustrates an embodiment of a third logic flow.
FIG. 10 illustrates an embodiment of a storage medium.

DETAILED DESCRIPTION

Figure 1:
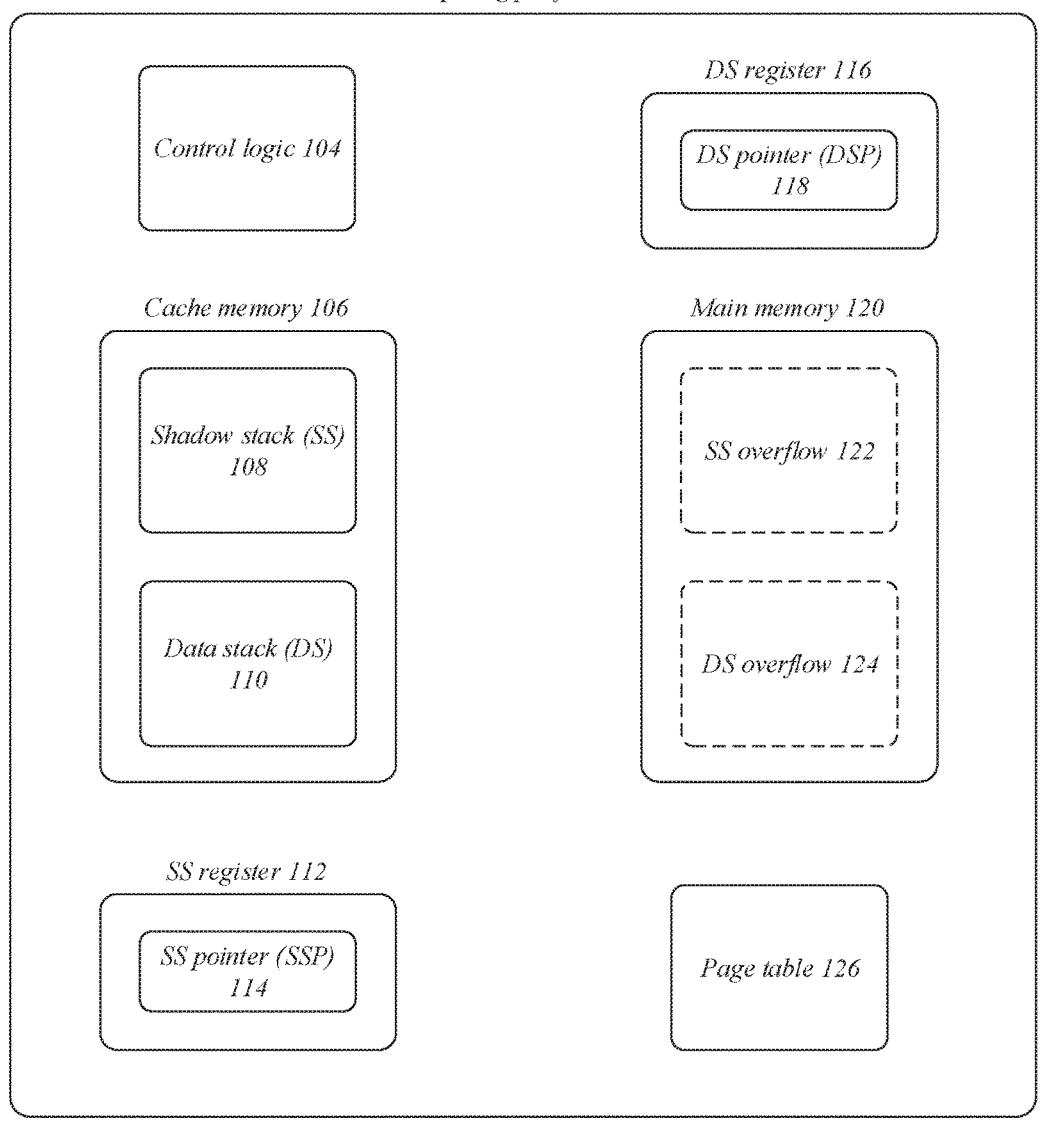
FIG. 1 illustrates an embodiment of a first operating environment.

Various embodiments are generally directed to techniques for control flow protection with minimal performance overhead, such as by utilizing one or more micro-architectural optimizations to implement a shadow stack (SS) to verify a return address before returning from a function call, for instance. Some embodiments are particularly directed to a computing platform, such as an internet of things (IoT) platform, that overlaps or parallelizes one or more SS access operations with one or more data stack (DS) access operations. In one embodiment, for example, an apparatus for control flow protection may comprise a memory and logic for a computing platform, at least a portion of the logic implemented in circuitry coupled to the memory. In various embodiments, the logic may write a return address onto a DS at a location identified by a DS pointer (DSP) value and calculate an SS memory address based on an SS pointer (SSP) value within a first instruction execution cycle and in response to a call instruction (CALL). In various such embodiments, the logic may write the return address onto the SS at the SS memory address calculated within the first instruction execution cycle and in response to the CALL. In some embodiments, the logic may read a first return address from a DS at a location identified by a DSP value and calculate a SS memory address based on an SSP value within a first instruction execution cycle and in response to a return instruction (RET). In some such embodiments, the logic may read a second return address from the SS at the SS memory address generated within the first instruction execution cycle and fetch an instruction from the first return address within a second instruction execution cycle and in response to the RET. These and other embodiments are described and claimed.

Some challenges facing computing platforms include the inability to implement robust control flow protections, such as via an SS, without incurring unacceptable performance overhead. These challenges may result from implementation of an SS requiring at least two writes to memory for each forward control transfer (e.g., CALLs, exception/interrupt delivery) and at least two reads from memory for each backward transfer (e.g., RETs, IRET). Further, computing platforms, such as internet of things (IoT) platforms, that utilize comparatively lower end processing cores, such as ones having one or more of a small cache, a single level cache, a unified cache, a single memory sub-system request generation path, fewer pipeline stages, a single arithmetic-logic unit (ALU), in-order instruction execution, and small store buffers, may incur unacceptable performance and power/energy overheads from the additional reads and writes required to implement a SS. Adding further complexity, many computing platforms must adhere to strict resource requirements. For example, implementation of an SS on a computing platform that needs to provide real time responses may provide negligible performance overheads to avoid any deviations from hard timing constraints. These and other factors may result in a computing platform with poor security and/or unacceptable performance overheads. Such limitations can drastically reduce the usability and applicability of a computing platform, contributing to ineffective systems with security vulnerabilities and limited capabilities.

Various embodiments described herein include one or more micro-architectural optimizations to alleviate disadvantages of implementing an SS in a computing platform with strict resource constraints and requirements. In some embodiments, the computing platform may overlap/mask SS address generation with DS write/read operations to support back to back writes and reads (e.g., DS and then SS). In various embodiments, the computing platform may initiate a branch request earlier by overlapping it with comparison of return addresses stored on the DS and the SS. In various such embodiments, unequal return addresses may directly trap to a control unit (though use of additional hardware signal) as opposed to using conditional controls to check comparison results and then trapping/jumping if applicable. In some embodiments, special hardware support may be included to incorporate an SS aware cache line replacement methodology that reduces the probability of cache out of an SS line between CALL-RET pairs or before the next CALL. In one or more embodiments, an SS hardware buffer, along with corresponding access and control logic, may be enable DS and SS writes and reads to be performed entirely in parallel. In one or more such embodiments, the corresponding access and control logic may be designed to not be in the memory request pipeline and/or not alter any design critical paths.

In various embodiments, existing hardware (e.g., ALU, dedicated stack adder, etc.) may be reused with the addition of necessary control logic. For example, instead of adding new logic/signals to control SSP updates, if the DS operations occur first in CALL/RETs, the DS hardware control signals (e.g., current CPU word length specifier, data stack adder carry in values, etc.) may be reused for controlling SSP updates. In one or more embodiments, dedicated hardware may refer to hardware included in a platform primarily, or solely to perform an associated function or procedure. In some embodiments, new data path hardware structures may be added. For example, apart from the additional SS activity control logic, a separate 32 bit SSP adder and/or a dedicated 32-bit comparator may be incorporated inside a core for SS implementation. In various embodiments, the SSP may be physical placed in a core sub-unit to minimize internal bus transfers. In one or more embodiments, the SSP may hold a linear address and may not involve any base segment in address calculation. In one or more such embodiments, SS address generation may include direct latching to the linear address bus (under appropriate control fields) instead of involving effective or linear address adders that are used for other addresses generated through segment and/or offset involvement. In these and other ways the computing platform may implement control flow protection via an SS with minimal performance overhead, resulting in several technical effects and advantages.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates an example of an operating environment 100 that may be representative of various embodiments. Operating environment 100 may include computing platform 102 with control logic 104, cache memory 106, SS register 112, DS register 116, main memory 120, and page table 126. In operating environment 100, control logic 104 may implement shadow stack (SS) 108 and data stack (DS) 110 within cache memory 106 with the potential for overflow portions of SS 108 and/or DS 110 being stored in main memory 120 as SS overflow 122 and DS overflow 124, respectively. It will be appreciated that SS 108 and DS 110 may utilize process or virtual memory space and overflow may occur in a transparent manner to programs utilizing SS 108 and DS 110. In other words, each of SS 108 and DS 110 may appear as continuous blocks of memory to executing programs despite instances when portions of SS 108 and/or DS 110 reside in main memory 120 as SS overflow 122 and/or DS overflow 124. In various embodiments, locations of portions of SS 108 and DS 110 (e.g., location in cache memory 106 and/or main memory 120) may be mapped in page table 126. In some embodiments, SS register 112 may include SS pointer (SSP) 114 and DS register 116 may include DS pointer (DSP) 118. In some such embodiments, the value of SSP 114 and DSP 118 may identify the top of SS 108 and DS 110, respectively. Embodiments are not limited in this context.

In various embodiments, computing platform 102 may be an interconnected device that gathers ambient information from the environment via different sensors, perform in-situ processing, and/or trigger different actuation paths, such as an internet of things (IoT) platform. Sometimes computing platform 102 may constitute automated, real-time systems, such as smart vehicles, industrial and environmental control platforms, smart energy grids, or network gateways. Many of these platforms have strict performance requirements. Further, platform form factors and deployment scenarios may require stringent resource (area, energy/power) requirements. Accordingly, one or more computing platforms 102 described herein may include components and algorithms that are selected and integrated across hardware-software layers to provide the performance requirements with system area, energy, and cost boundaries while still providing robust control flow protection via implementation of SS 108.

In some embodiments, SS 108 may be exclusively used for read and writes during control transfer operations (e.g., CALLs, RETs, interrupt/exception deliver). In various embodiments, SS 108 may not be accessible to normal load/store instructions. In some embodiments, SS 108 may be a part of normal process (virtual) memory. In some such embodiments, page table 126 may map the location of each portion of SS 108 in physical memory. In various embodiments SS 108 may be protected from tamper via a bit in page table 126. In some embodiments, SS register 112 may be an architectural register that holds the linear address, as SSP 114, for the current top of SS 108. In some such embodiments, page table 126 may map linear addresses to physical addresses.

In one or more embodiments described herein, implementation of SS 108 may provide negligible performance overheads to avoid any deviations from hard timing constraints. In one or more such embodiments, this may enable the architecture of computing platform 102 to remain invariant to prevent any significant increase in design/test complexity and cost. In some embodiments, computing platform 102 may adhere to minimal area and energy/power overheads. In various embodiments, one or more performance-area-power aware micro-architectural optimizations may be utilized to enable efficient implementation of SS 108 on computing platform 102. In various such embodiments, implementation of SS 108 on computing platform 102 may provide robust security against return oriented programming (ROP) attacks. In some embodiments, one or more optimizations described herein may be selected for implementation based on corresponding system requirements and constraints.

In one or more embodiments, control logic 104 may store a return address associated with a call instruction (CALL) to both SS 108 and DS 110. In one or more such embodiments, upon encountering a return instruction (RET) associated with the CALL, control logic 104 may read the return addresses stored in SS 108 and compare them to determine whether the return address stored in DS 110 has been manipulated. In various embodiments described herein, control logic 104 may overlap or mask one or more SS 108 access operations with one or more DS access operations. For instance, SS 108 address generation may be overlapped with DS 110 write/read operations. In some embodiments, control logic 104 may utilize SSP 114 and DSP 118 to locate the respective return addresses. In some such embodiments, page table 126 may be utilized to determine the memory address of the respective return addresses. For example, page table 126 may be used to determine whether a portion of SS 108 is in cache memory 106 or main memory 120.

Logically, the underlying performance optimization methodology may be to parallelize as much of the SS 108 and DS 110 operations as possible, at minimal increase of dynamic power and no significant increase in resource area. In one or more embodiments, critical paths are not touched by the implementation of optimizations described herein. In some embodiments, performance/power analysis may be critical for NEAR CALL and RETs, which may be of much higher frequency (than FAR control transfers) in programs and already optimized for low latency in base design.

In various embodiments, computing platform 102 may have a single memory request (read/write) path. In various such embodiments, if DS 110 operations occur first, design choices may involve masking SS 108 memory address generation within the DS 110 read/write cycles. In some embodiments, this may involve overlapping calculation of a next SSP 114 value and consequent update as well as sending updated or old SSP 114 value to latch to a linear address (LA) bus (see e.g., FIG. 4, latch 415 and LA bus 418). In one or more embodiments, on RETs, the branch cycle memory request, which would mainly involve restarting fetcher (see e.g., FIG. 4, instruction fetch unit 424) and hence extra latency, may be initiated prior to comparison between DS 110 and SS 108 return addresses identified by DSP 118 and SSP 114 respectively. In one or more such embodiments, this may occur while causing SS 108 control protection faults to be handled properly. In some embodiments, the optimizations may lead to support of back to back DS 110 and SS 108 writes/reads, assuming cache hits in the nominal case (i.e., the return addresses in SS 108 and DS 110 are both located in cache memory 106). In some such embodiments, this may lead to only one cycle of overhead for CALLs and RETs each.

In some embodiments, computing platform 102 may have very small cache memory 106 (e.g., <8 kilobytes), which may result in portions of SS 108, such as an SS line, being cached out (i.e., moved to main memory 120) between a CALL and corresponding RET or before the next CALL. In various embodiments described herein, when overflow occurs, an SS aware cache line replacement policy may be used to preserve an SS line inside cache memory 106 longer than the SS line would be without SS awareness. In some embodiments, SS awareness may be provided via a bit in each entry of page table 126 that indicates whether an SS line is stored at the associated memory location.

In some embodiments, such as when computing platform 102 includes an IoT platform, function call depths for a majority of scenarios may be eight or less. In some such embodiments, this may include execution on top of real time operating systems. In various embodiments, this may result in a single cache way being active for SS 108 read/writes. In some embodiments, the memory foot print of computing platform 102 may be limited, and more call depth may mean more stack memory requirements for local data (additional function parameters, local variables, previous contexts, etc.). Accordingly, in one or more embodiments, function call depths may be utilized in determining and implementing the SS aware cache line replacement policy. Further, function call depths may be utilized in creating, or selecting libraries and compilers associated with programs executed by computing platform 102. For instance, a compiler may be selected or created that optimizes programs for minimal function call depths. In various embodiments, based on trade-offs regarding effect on performance of other programs, complexity of implementation, and allowable area overheads, computing platform 102 may include a buffer separate from cache memory 106 to store SS 108 as will be described in more detail with respect to FIG. 2.

Figure 2:
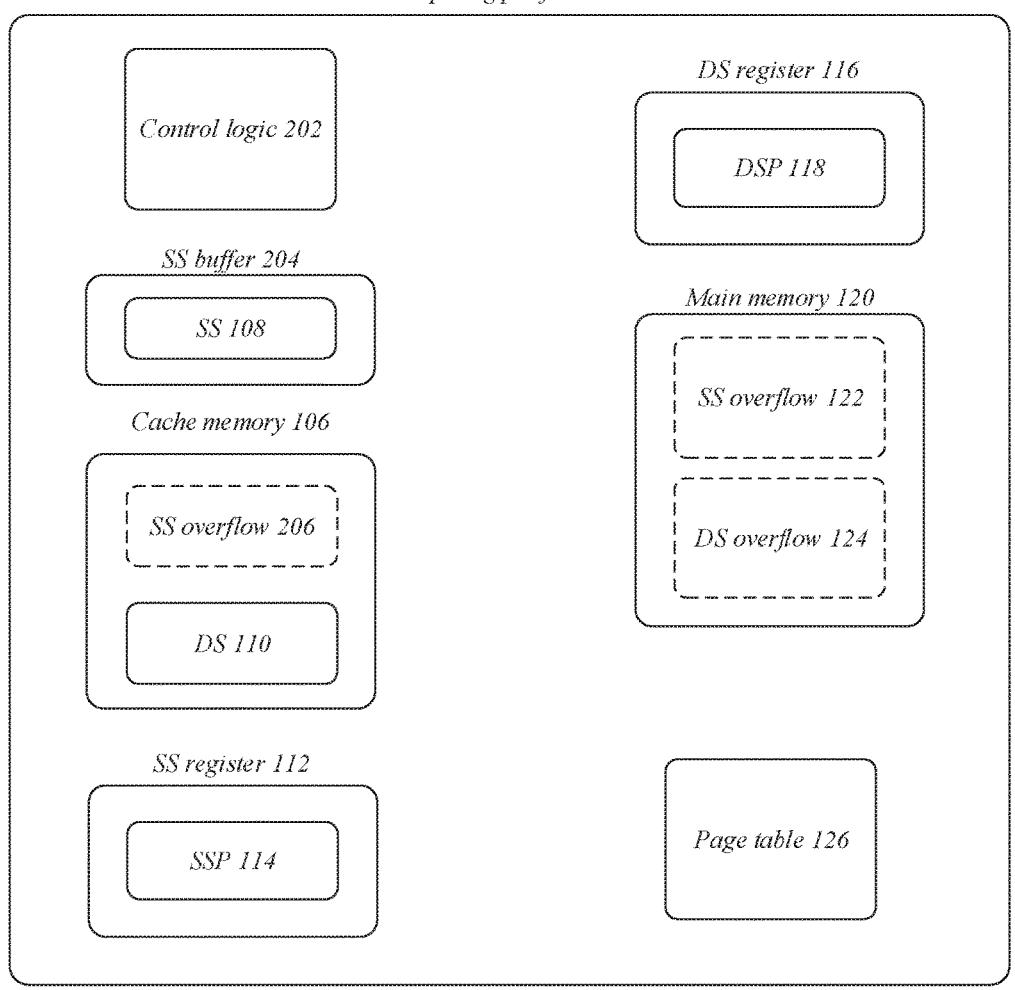
FIG. 2 illustrates an embodiment of a second operating environment.

FIG. 2 illustrates an example of an operating environment 200 that may be representative of various embodiments. Operating environment 200 may be the same or similar to operating environment 100 except for the addition of SS buffer 202 to store SS 108, control logic 204 comprising additional or different logic than control logic 104 to implement SS buffer 202, and the potential to have SS overflow 206 stored in cache memory 106. In some embodiments, control logic 202 may cause SS buffer 204 to first overflow into cache memory 106 as SS overflow 206 and then overflow from cache memory 106 into main memory 120 as SS overflow 122. In other embodiments, control logic 202 may cause SS buffer 204 to overflow directly to main memory 120 as SS overflow 122. Embodiments are not limited in this context.

Figure 4:
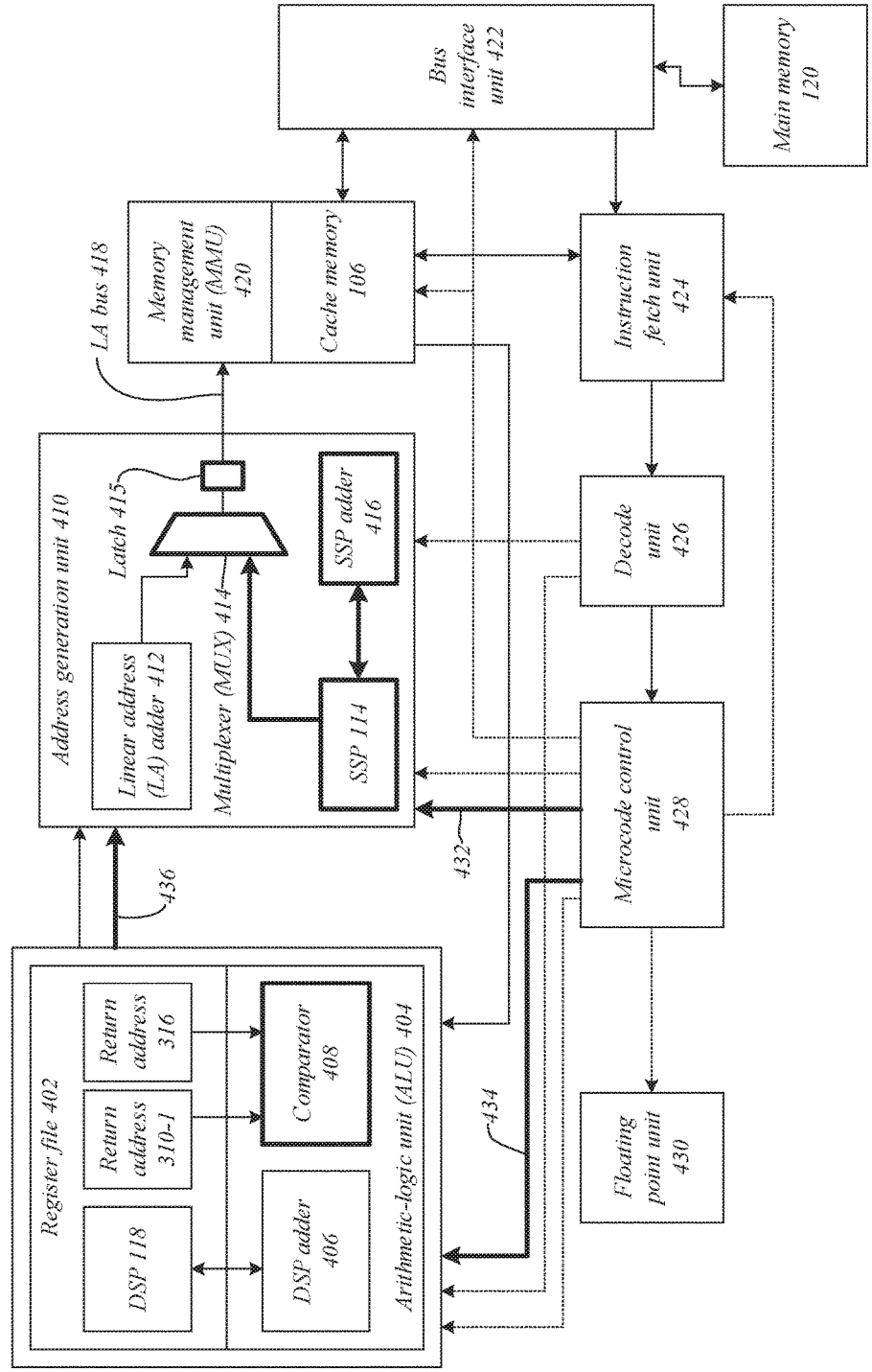
FIG. 4 illustrates an embodiment of a fourth operating environment.

In various embodiments, SS buffer 202 may be a dedicated hardware buffer inserted inside a processing core. As previously mentioned, function call depths for a majority of scenarios may be eight or less. Accordingly, in some embodiments, SS buffer 202 may include an 8-entry buffer. In one or more embodiments, utilization of SS buffer 202 may lead to no CALL-RET overheads, as long as there is no overflow. In one or more such embodiments, no CALL-RET overheads when there is no overflow may come at the expense of higher area overheads. In some embodiments, along with implementation of one or more of the optimizations described herein, analysis may be concurrently performed to determine whether new hardware units are needed to maintain a required performance target. For example, a dedicated SSP adder for SSP updates or a separate comparator for final equality tests may be included (see, e.g., FIG. 4, comparator 408 and SSP adder 416, respectively).

However, in various embodiments, if existing structures like an ALU or dedicated DS adder (see e.g., FIG. 4, ALU 404 and DSP adder 406 respectively) are inactive in respective cycles, they may be reused for masked SS operations. In various such embodiments, the additional re-use control logic may be lighter-weight and more power-efficient when compared to new dedicated data path units. In some embodiments, as SSP 114 is not used in normal load/store instructions, SS register 112 may be located in a unit which would minimize internal bus transfers for SS address generation. In some such embodiments, this may save power/energy. In embodiments that utilize an SSP adder, to take advantage of the aforementioned function call depths, an eight-bit adder may be utilized along with SSP bit extract/update logic. In one or more embodiments, DS 110 control signals already generated may be reused for performing SSP 114 updates.

Figure 3:
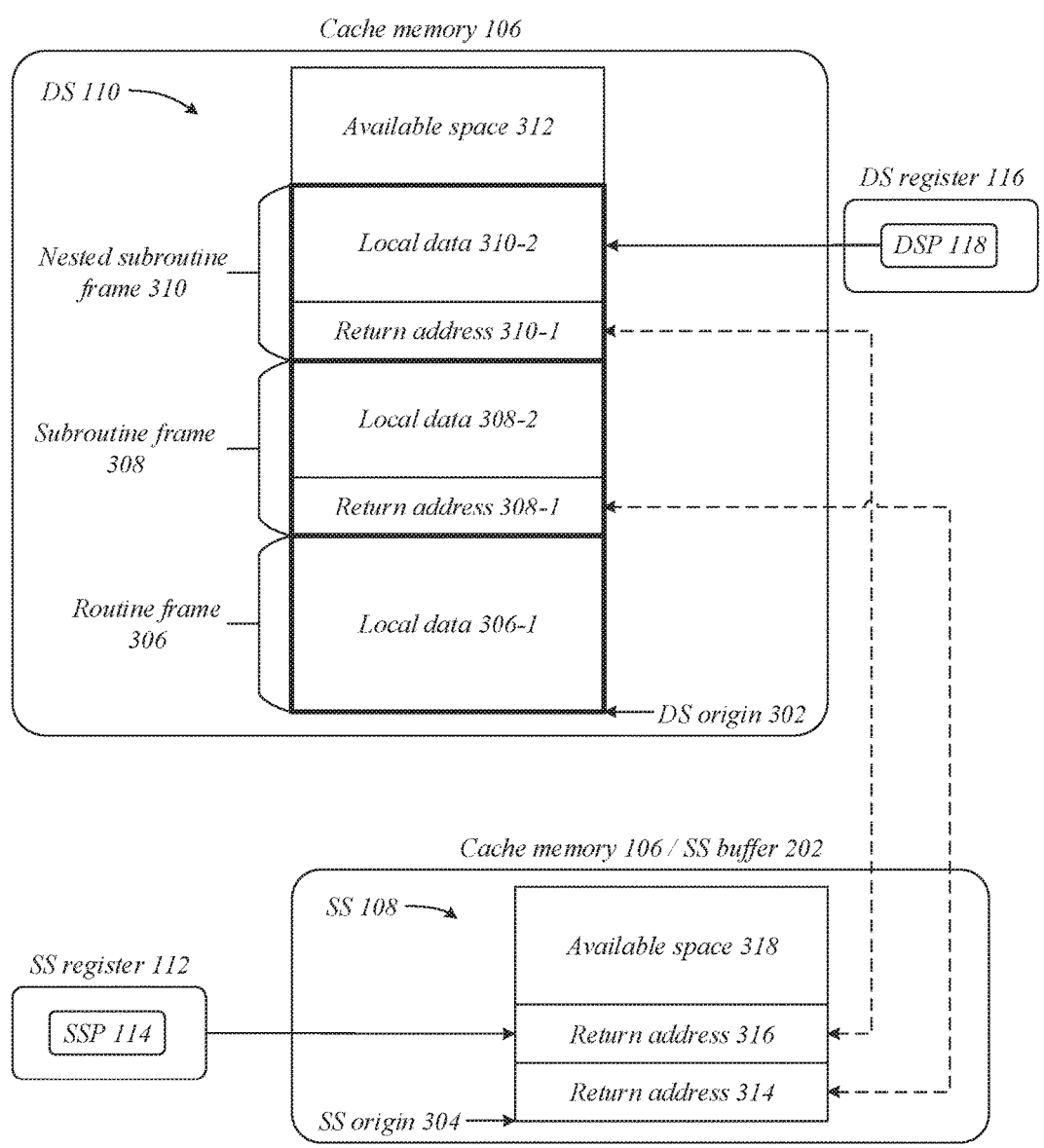
FIG. 3 illustrates an embodiment of a third operating environment.

FIG. 3 illustrates an example of an operating environment 300 that may be representative of various embodiments. Operating environment 300 may include DS 110 in conjunction with DSP 118 and DS origin 302 and SS 108 in conjunction with SSP 114 and SS origin 304. In operating environment 300, DSP 118 and SSP 114 are shown as pointing to the location on DS 110 and SS 108 to which their values identify. In some embodiments, DSP 118 points to the top of DS 110 and SSP 114 points to the top of SS 108. The bottom of DS 110 is at DS origin 302 and the bottom of SS 108 is at SS origin 304. In various embodiments, each of routine frame 306, subroutine frame 308, and nested subroutine frame 310 may be associated with different instruction sequences that may be entered via CALLs and/or exited via RETs. In various such embodiments, the frames 306, 308, 310 may demonstrate the portion of DS 110 that is accessible by the associated instruction sequence. In some embodiments, nested subroutine frame 310 may correspond to a function call depth of three. For example, a first instruction sequence may comprise a routine that calls a second instruction sequence that comprises a subroutine that calls a third instruction sequence that comprises a nested subroutine. Embodiments are not limited in this context.

In various embodiments, with shadow stack enabled software, during forward control flow transfers like procedure CALL instructions of different variants (e.g., CALL imm, CALL r/m, etc.) as well as interrupt/exception occurrences, the return address information may be stored both on DS 110 and SS 108 in process memory. On RET instructions of different variants (e.g., RET, RET imm, 1RET, etc.), in some embodiments, at the end of functions/handlers, the return addresses are read from both stacks (i.e., SS 108 and DS 110), compared, and an exception may be raised if the return addresses are found to be unequal.

In one or more embodiments described herein, utilization of DS 110 and SS 108 may proceed as follows. Initially, DSP 118 and SSP 114 may point to the same location as DS origin 302 and SS origin 304, respectively. A routine comprising a first instruction sequence may increment DSP 118, then store local data 306-1 to DS 110 at the location in routine frame 306 pointed to by DSP 118. In some embodiments, the act of incrementing DSP 118, then storing data to DS 110 where DSP 118 points may be referred to as pushing the data onto DS 110. In various embodiments, as data is pushed onto DS 110, available space 312 may shrink correspondingly. In various such embodiments, when available space 312 is insufficient to store data pushed onto DS 110, overflow may occur. As previously discussed, in practice, overflow may occur transparently to programs (e.g., routine, subroutine, nested subroutine) when DS 110 is implemented in virtual or process memory.

In some embodiments, the routine may later call a subroutine comprising a second instruction sequence via a CALL. In response to the CALL, return address 308-1 may be pushed onto DS 110. In various embodiments, return address 308-1 may provide a way to return to the routine from the subroutine. Additionally, to enable control flow protection, SSP 114 may be incremented from SS origin 304 and data equivalent to the value of return address 308-1 may be stored to SS 108 as return address 314 in response to the CALL. In one or more embodiments, the act of incrementing SSP 114, then storing data to SS 108 where SSP 114 points may be referred to as pushing the data onto SS 108. In some embodiments, as data is stored to SS 108, available space 318 may shrink correspondingly. In some such embodiments, when available space 318 is insufficient to store a return address, overflow may occur. As previously discussed, in practice, overflow may occur transparently to programs (e.g., routine, subroutine, nested subroutine) when SS 108 is implemented in virtual or process memory.

In various embodiments, during execution of the subroutine, local data 308-2 may be pushed onto DS 110 in subroutine frame 308. In various embodiments, the subroutine may later call a nested subroutine comprising a third instruction sequence via a CALL. In response to the CALL, return address 310-1 may be pushed onto DS 110. In various embodiments, return address 310-1 may provide a way to return to the subroutine from the nested subroutine. Additionally, to enable control flow protection, SSP 114 may be incremented from pointing to return address 314 and data equivalent to the value of return address 310-1 may be stored to SS 108 as return address 316 in response to the CALL.

In some embodiments, during execution of nested subroutine, local data 310-2 may be pushed onto DS 110. When the nested subroutine needs to utilize local data 310-2, it is read from DS 110 and DSP 118 is then decremented to point to return address 310-1. In various embodiments, the act of reading data from DS 110 and then decrementing DSP 118 may be referred to as popping the data from DS 110. In some embodiments, the third instruction sequence may conclude with a RET. The RET may cause, return address 310-1 to be popped from DS 110. Additionally, return address 316 may be read from SS 108 and SSP 114 may be decremented to point at return address 314. In various embodiments, the act of reading data from SS 108 and then decrementing SSP 114 may be referred to as popping the data from SS 108.

In one or more embodiments described herein, an instruction from return address 310-1 may be fetched in the same instruction execution cycle as return address 316 is read from SS 108. In various embodiments, pushing/popping local data 306-1, 308-2, 310-2 to/from DS 110 may utilize normal load/store instructions. In contrast, pushing/popping return addresses 314, 316 to/from SS 108 may utilize load/store instructions that are not normal load/store instructions (e.g., protected within a core or central processing unit (CPU)). In some embodiments, a CALL that pushes a return address onto DS 110 and SS 108 at specific locations and a RET that pops the data from DS 110 and SS 108 at the specific locations for comparison may be referred to as a CALL-RET pair.

In various embodiments, in response to a CALL, DS 110 may be written (e.g., at the address pointed to by DSP 118) with a return address value as part of a first instruction execution cycle. In one or more embodiments described herein, execution cycle may be used to differentiate from fetch and decode cycles in a CPU pipeline. In some embodiments, the next SS address may be calculated on a first instruction execution cycle and the second (or next) instruction execution cycle (DS 110 write completes), the SS 108 write is performed. In various embodiments, the same principles for DS 110 and SS 108 writes may hold for DS and SS reads during RETs. In various such embodiments, for cache hits, SS incorporation may only incur a one cycle penalty as compared to embodiments without SS incorporation.

In one or more embodiments, once return address 310-1 and return address 316 are read from DS 110 and SS 108, respectively, they may be compared to each other. If return addresses 310-1, 316 are still equivalent, the instruction fetched from return address 310-1 may be executed. However, if return addresses 310-1, 316 are no longer equivalent, an exception may be generated. When return addresses 310-1, 316 are no longer equivalent, return address 310-1 may have been overwritten as part of a return oriented programming (ROP) attack. Thus, the exception may prevent a malicious user from hijacking the control flow. Further, the subroutine may return to the routine in the same or similar manner as described above. Accordingly, DS 110 and SS 108 may dynamically grow and shrink as data is stored and read from them. Additionally, when DS 110 and SS 108 are implemented in virtual or process memory, available space 312, 318 may be independent of physical memory space (e.g., the size of cache memory 106 or SS buffer 202).

As previously mentioned, in some embodiments, computing platform 102 may include a real-time, automated, and/or safety critical IoT platform, and hence guaranteeing negligible performance degradation or similarly providing resource availability at all times may be of utmost importance. Accordingly, in various embodiments described herein, optimizations may revolve around applicability to NEAR CALLs and RETs, which are more frequent in a program and often heavily optimized for minimal base latency in original design. Further, one or more embodiments may focus on generic micro-architectural optimizations to alleviate inherent disadvantages arising from tight resource constraints in lower in cores like a single memory sub-system path (e.g., a single memory request pipeline), small caches, a few pipeline stages, a single ALU for all data operations, and/or in-order instruction execution. For example, some IoT cores may include only a single memory request pipeline, thus both DS and SS writes/reads cannot occur in parallel. In such examples, overlapping or masking SS address generation within DS write/reads may alleviate disadvantages associated with a single memory request pipeline. In some embodiments, the optimizations may not touch the critical path of an existing design. As will be described in more detail with respect to FIGS. 4-6, the optimizations may be categorized roughly into address generation overlap/masking, SS aware cache line replacement, shadow stack buffer, and power/energy optimizations.

FIG. 4 illustrates an example of an operating environment 400 that may be representative of operations computing platform 102 may perform in various embodiments to enable shadow stack (SS) operation and overlap/masking SS operations with DS operations. Operating environment 400 may include register file 402, arithmetic-logic unit (ALU) 404, address generation unit 410, memory management unit (MMU) 420, cache memory 106, bus interface unit 422, main memory 120, instruction fetch unit 424, decode unit 426, microcode control unit 428, and floating point unit 430. In the illustrated embodiment, the lines with heavier weight may represent portions of computing platform 102 that may be included to support SS implementation and overlap/masking of SS operations with DS operations. These portions may include comparator 408, SSP 114, multiplexer (MUX) 414, latch 415, SSP adder 416, and control signals/data flows 432, 434, 436. Additionally, the solid lines with lighter weigh may represent existing data flow paths inside a core and the dashed lines with lighter weight may represent existing control signals. In some embodiments, one or more of control signals/data flows 432, 434, 436, may be existing control signals that are reused. Embodiments are not limited in this context.

In various embodiments, general operation of computing platform 102 may proceed as follows. Microcode control unit 428 may request instruction fetch unit 424 to retrieve an instruction. In response, instruction fetch unit 424 may retrieve the requested instruction from either cache memory 106 or main memory 120. Instructions retrieved from main memory 120 may pass through bus interface unit 422 while instructions retrieved from cache memory may pass through MMU 420. In some embodiments instruction fetch unit 424 may retrieve all requested instructions via MMU 420. Once instruction fetch unit retrieves the instruction, decode unit 426 may decode it and pass it to microcode control unit 428. Based on the retrieved instruction, microcode control unit 428 may perform a variety of operations. For instance, if floating point operations are required, microcode control unit 428 may instruct floating point unit 430 to do so. If arithmetic or logical operations are required, ALU 404 may be instructed to do so. In various embodiments, some arithmetic or logical operations may utilize data stored in register file 402. Once the arithmetic or logical operations are completed, the results may be sent to address generation unit 410 for storage. In some embodiments, the results may first be stored in register file 402 before being passed to address generation unit 410.

In some embodiments, address generation unit 410 may utilize linear address (LA) adder 412 to convert a process or virtual memory address to a linear address. In some such embodiments, LA adder 412 may add a base or offset to the virtual memory address to calculate a corresponding linear address. In various embodiments, the linear address may be passed to MMU 420 via LA bus 418. In various such embodiments, MMU 420 may convert the linear address to a physical address and cause the results of the arithmetic or logical operations to be stored in the corresponding memory (e.g., cache memory 106 or main memory 120).

As previously mentioned, computing platform 102 may not be able to execute DS and SS memory write/read requests in parallel due to a single memory pipeline. Thus, SS address generation may be overlapped/masked with that of DS write/read operations to support back to back writes and reads (e.g., DS and then SS). In one or more embodiments described herein, a shadow stack may be implemented by computing platform 102 with address generation overlap as follows. For CALLS, SSP 114 may be computed or updated before SS address formation (within DS write cycles). For instance, SSP 114 may be updated by SSP adder 416 by adding or subtracting a word length (wl) utilized by computing platform 102. For RETs, a current value of SSP 114 may be used for memory address generation and SSP 114 update could be masked with a DS or SS write operation. In various embodiments, an SSP value or updated SSP value may be sent to latch 415, which is communicatively coupled to LA bus 418, to support back to back writes and reads. In some embodiments, MUX 414 may be used to control whether LA adder 412 or SSP 114 is able to pass data to LA bus 418. In one or more embodiments, control signal 436 may be a DSP control signal that is reused for SSP updates.

In various embodiments, however, care may need to be taken to not overwrite a current linear address for DS with that of SS. For instance, this concern may be applicable in cases of corner scenarios such as a DS cache miss, a translation lookaside buffer (TLB), and/or other faults. In some embodiments, this methodology of address generation and SSP 114 update overlap may be applicable for CALL imm, CALL r/m as well as RET, RET imm. However, in one or more embodiments, additional hardware structures may be required, which will be discussed in more detail below. In various embodiments, RETs may involve branching to return addresses based on equality of DS and SS popped values.

In some embodiments, such as the illustrated embodiments of FIG. 4, computing platform 102 may have a hardware pre-fetcher (e.g., instruction fetch unit 424). In some such embodiments, depending on whether the pre-fetcher includes branch prediction units (e.g., branch target buffers, return stack buffers, etc.), and their corresponding capability or functionality available, the pre-fetcher may be restarted at the return address as part of a RET, resulting in unnecessary wait cycles. However, in various embodiments described herein, the unnecessary wait cycles may be avoided by initiating a branch request earlier and overlapping it with the final comparison step between the return addresses 310-1, 316 identified by DSP 118 and SSP 114, respectively (just after DS and SS read). In various embodiments, the return addresses may be stored in temporary registers on successful reads.

In one or more embodiments, to realize one or more of the performance gains through this methodology, unequal return addresses (or return pointers) may directly trap, such as through additional control signals (e.g., control signal 432, 434, and/or 436) to microcode control unit 428 instead of using conditional controls to check comparison results and trap/jump if applicable. Accordingly, in a nominal scenario of cache hits for both DS and SS and/or unfilled store buffers, back to back writes and reads may be supported for CALLs and RETs, respectively. In such scenarios, this may cause CALLs and RETs to typically incur one cycle of overhead. In various embodiments, for CALL r/m, as target address generation involves register or memory read cycle(s), additional opportunities for masking SS operations and saving additional cycles may be realized. In various such embodiments, saving additional cycles may depend on base implementation.

In various embodiments, based on the frequency of CALL-RET pairs in a program, a one cycle cost per CALL/RET may suffice to achieve the performance goals of an implementation of computing platform 102. For instance, a one cycle cost per CALL/RET may result in <0.5%-1% overhead. However, in some scenarios, such as those with a small, unified single level cache (e.g., <16 kilobytes) common in cores used in lower end computing platforms, such as IoT platforms, the SS may be cached out to main memory 120 between a CALL and corresponding RET, which requires SS read and hence is critical). In some such scenarios, if the DS, which is also used for push and pop operations other than in CALLs and RETs (e.g., push/pop local data), hits in cache memory 106, a CPU may incur significant extra cycles to bring the SS line to the cache, especially with in order execution. Further, in various embodiments, this may also cause an issue if an SS line is cached out before next CALL, in the case of filed store buffers. For instance, this may occur in part due to very small write buffers (e.g., 4 entries). In various such embodiments, this could result in significant and unacceptable performance overheads. In some embodiments described herein, this issue may be alleviated by utilizing a shadow stack hardware buffer or an SS aware cache line replacement, which will each be described in more detail with respect to FIGS. 5-6, respectively.

Figure 5:
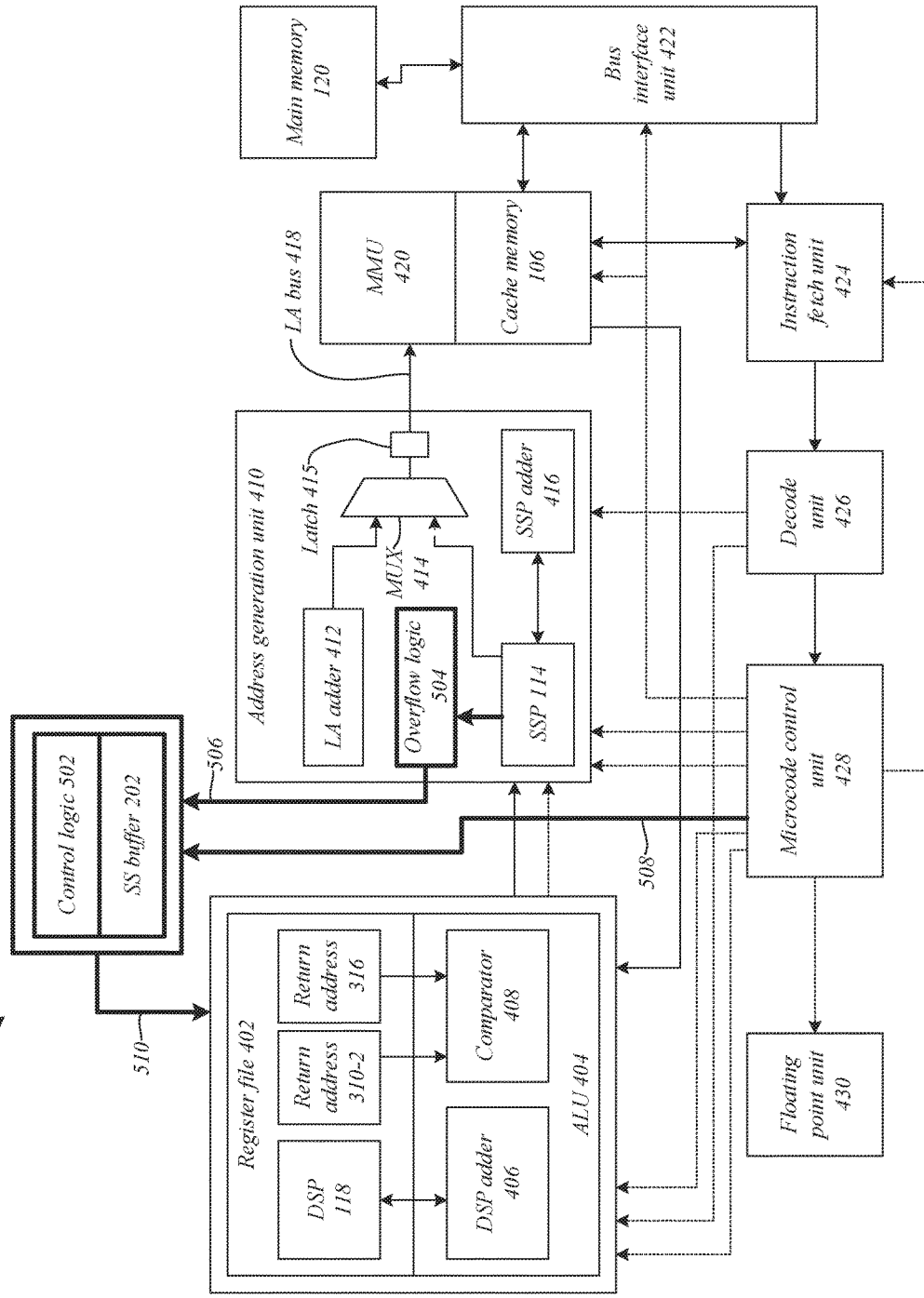
FIG. 5 illustrates an embodiment of a fifth operating environment.

FIG. 5 illustrates an example of an operating environment 500 that may be representative of operations computing platform 102 may perform in various embodiments to implement an SS buffer 202. Operating environment 500 may include the same or similar components as operating environment 400, including the portions included to enable shadow stack (SS) operation and overlap/masking SS operations with DS operations. Further, in some embodiments, general operation of computing platform 102 described with respect to operating environment 400 may hold true for operating environment 500. In the illustrated embodiment, the lines with heavier weight may represent additional portions of computing platform 102 that may be included to support implementation of SS buffer 202. These portions may include control logic 502, SS buffer 202, overflow logic 504, and control signals/data flows 506, 508, 510. In one or more embodiments, SS buffer 202 and control logic 502 may be designed specifically not to be in the memory request pipeline and/or not altering the design critical path. In one or more such embodiments, this may enable DS and SS writes and reads to be performed entirely in parallel when SS buffer 202 does not overflow. In various embodiments, control logic 104 may include control logic 502 and/or overflow logic 504. Embodiments are not limited in this context.

In one or more embodiments described herein, SS buffer 202 may be included based on function call depths of programs utilized in various embodiments of computing platform 102. For example, SS buffer 202 may include an eight-entry hardware buffer included inside a CPU of computing platform 102. In such instances, the first eight entries of SS memory may be mapped to SS buffer 202. On a CALL, the next buffer entry may be written and on a RET, the current entry may be read. In some embodiments, with SS buffer 202, its corresponding access and control logic may be designed to not be in the memory request pipeline and not alter the design critical path such that DS and SS writes and reads can be done entirely in parallel in the absence of SS buffer overflow.

In various embodiments, depending on original timing margins and corner cases, the final comparison between the DS and SS read return addresses during RET may be included in the final read cycle, leading to no performance overheads for either CALL or RET. Otherwise, a one cycle penalty may be incurred for RET and not for CALLs in the nominal case (no overflow). Other design considerations associated with utilizing SS buffer 202 may include the comparatively higher area (and thus leakage) overhead of SS buffer 202, as well as the additional hardware support and complexity in implementation required for handling the corner case (i.e., not nominal case) of SS buffer 202 overflow via overflow logic 504, context switch (if applicable), and task context save scenarios.

In some embodiments, after overflow exists, all SS accesses may go normally though the memory sub-system. Accordingly, address generation logic may need to be enhanced to be aware of the two separate physical access choices for SSP 114 (i.e., SS buffer 202 or memory via LA bus 418). In various embodiments, the enhanced address generation logic may be included in overflow logic 504. In one or more embodiments, the enhanced address generation logic may cause SSP 114 to always be directed to an existing linear address generation module (e.g., segmentation unit, such as in Intel® Minute® Itanium® Architecture). Accordingly, on observing the value of SSP 114, whose lower 5 bits may signify the number of active entries in SS buffer 202, the access may be diverted to either SS buffer 202 or memory via LA bus 418. Further, some embodiments may not include any backing in memory for SS buffer 202. In some such embodiments, context saving, such as during task and/or privilege switches would have to be done with special considerations. For example, buffer writes to a corresponding physical memory may be required. In one or more embodiments, the gains from far more frequent SS buffer hits (and potentially no SS performance overhead) would outweigh the comparatively much less frequent buffer overflow and switches that would incur high latency overhead. In various embodiments, the size of SS buffer 202 may be determined based on the cost-benefit tradeoffs. For example, an 8, 16, or more entry SS buffer may be utilized.

FIG. 6 illustrates an example of an operating environment 600 that may be representative of operations computing platform 102 may perform in various embodiments to implement an SS aware cache line replacement. Operating environment 600 may include the same or similar components as operating environment 400, including the portions included to enable shadow stack (SS) operation and overlap/masking SS operations with DS operations. Further, in some embodiments, general operation of computing platform 102 described with respect to operating environment 400 may hold true for operating environment 600. In the illustrated embodiment, the lines with heavier weight may represent additional portions of computing platform 102 that may be included to support implementation of SS aware cache line replacement. These portions may include page table entry (PTE) 602 and SS aware cache line replacement policy 604. Embodiments are not limited in this context.

In various embodiments described herein, when overflow occurs, SS aware cache line replacement policy 604 may be used to preserve an SS line inside cache memory 106 longer than the SS line would be without SS awareness. In some embodiments, SS awareness may be provided via a bit in each PTE 602. In some such embodiments, PTE 602 may indicate whether an SS line is stored at the associated memory location. In one or more embodiments, page table 126 (see e.g., FIG. 1) may include each PTE 602.

In some embodiments, a cache line may hold a plurality of return instruction pointers or return addresses. For instance, a cache line of 64 bytes would hold 16 return instruction pointers (considering NEAR CALLs) in a computing platform 102 with a 32-bit word length. In such instances, a maximum of two or three active FAR CALLs or interrupt/exception handler scenarios (where you also store the code segment if applicable) in corner cases may still support a function call depth of 10-12. In various embodiments, a function call depth of 10-12 would support the maximum call depths of embedded programs in a majority of scenarios. Accordingly, in some embodiments, only one cache line belonging to SS page may be utilized for SS operations.

In one or more embodiments, to reduce the probability of caching out of the SS line between CALL-RET pairs or before a next CALL, especially in computing platforms 102 with small cache subsystems, store buffers, and/or particular workload characteristics, special hardware support may be added to incorporate SS aware cache line replacement policy 604. As previously mentioned, a bit of each PTE 602 may be used to provide SS awareness. For instance, in various embodiments, a bit of each PTE 602 may be used to provide SS page protection against tamper (similar to a no-execute bit). In such instances, that bit may be incorporated in the SS aware cache line replacement policy 604 to select the evicted line. In some embodiments, SS aware cache line replacement policy 604 may include a replacement policy that modifies a least recently used (LRU) or pseudo LRU replacement policy with SS awareness.

In various embodiments, additional hysteresis may be introduced in the SS line aging counter bits (e.g., if SS line, incremented by one in case of five set accesses since last). In some embodiments, the logic added to implement the cache line replacement policy may be minimal from an area/power view point. However, in some embodiments, a downside may be significant effects on the performance of other programs as compared to non-SS aware cache line replacement policies. In some such embodiments, this may especially hold true for computing platforms 102 with unified cases. Accordingly, design space exploration may be performed to select the associated parameters of the SS aware cache line replacement policy 604 based on trade-offs between SS operation efficiency and negative effect on other programs.

In embodiments, such as those in which computing platform 102 includes a real time and/or embedded resource constrained platforms, apart from achieving negligible performance degradations of implemented platform features, achieving minimal energy/power as well as area and/or cost overheads may be critical as well. From this aspect, for new SS operations that may be masked, such as next SSP value calculation and update, SS address generation, comparison of return addresses or return pointers, constraints of a performance target, and the like, additional data path hardware structures may need to be added depending on original core resources and potential structural hazards on CALL/ RETs. For instance, apart from the nominal additional SS activity control logic, a separate 32 bit SSP adder (e.g., SSP adder 416) and/or a dedicated 32-bit comparator (e.g., comparator 408) may be incorporated inside the core for SS implementation.

However, multiple micro-instruction re-ordering combination should be considered before adding new data path hardware, as any possibility of reuse of existing hardware sub-units (like ALU 404, DSP adder 406, etc.) with only the addition of control logic may be more light-weight and energy-efficient than separate dedicated data path units. Further, from an implementation complexity point of view, such as if a core is internally microcode controlled, it may be more beneficial to define new micro-operations for controlling the existing hardware units for SS activity (e.g., re-use scenario). In some embodiments, this may allow existing instruction flows to be left untouched.

Further, in embodiments that seek to minimize power/ energy overheads resulting from SS incorporation, apart from minimization (through possible reuse) of the SS operation control logic, one or more of the following optimization may be adopted. First, as internal bus transfers (inside core) may require considerable power, SSP 114 may be placed in a core sub-unit that minimizes communications due to SS operations. Accordingly, as SSP 114 may not be used as operands in normal load and store instructions (e.g., MOV, XSAVE from Intel® x-86) from register file 402, it may be physically placed in the sub-unit with linear address generation logic (e.g., address generation unit 410). In some embodiments, this may remove one or more internal bus transfers incurred due to SSP or updated SSP transfer from other sub-units to the address generation module.

Second, in one or more embodiments, SSP 114 may directly hold a linear address and may not involve any base segment address calculation. Accordingly, in various embodiments and as previously mentioned, SS address generation may be performed, at least in part, by directly latching (e.g., via latch 415) to LA bus 418. For instance, SSP 114 minus the word length may be directly latched to LA bus 418 for CALLs and SSP 114 may be directly latched to LA bus 418 for RETs. In some embodiments, this may require the use of appropriate control fields. In one or more embodiments, this may remove the need for effective or linear address adders (e.g., LA adder 412) used for other addresses generated through segment and/or offset involvement.

Third, as previously mentioned, the maximum call depths of embedded programs that include real time operating system may mostly be less than 8. Further, in some instruction set architectures (e.g., Intel® x-86), SSP 114 may be in a 32-bit register. In various embodiments, this may include SS register 112. However, the call depths may indicate maximum SSP changes by +/−32 bytes (8×4) as only the lower 5 bits of the register may be involved in some embodiments. Accordingly, in embodiments that a separate SSP adder is incorporated to meet performance targets, an 8-bit adder (if present in technology library) may be selected with associated control for extraction and update of the lower 8 bits of SSP 114. However, in one or more embodiments, depending on the lowest granularity of data path units supported in technology library, this may have to be a 16-bit adder. Either way, this may lead to savings in both leakage and dynamic power as compared to a 32-bit SSP adder.

Fourth, in various embodiments, CALLs may lead to update of SSP by SSP+wl, where wl is the current CPU word length (e.g., 16, 32, 64 bit) whereas RETs may cause SSP update by SSP−wl. In various such embodiments, similar control logic may be utilized for DS operations in CALL/RET instructions. Accordingly, instead of adding new logic/signals to control SSP updates, in embodiments in which DS operations occur first in CALL/RETs, the DS hardware control signals (e.g., CPU wl specifier, DS adder carry in values, etc.) may be used for controlling the SSP updates.

Fifth, in embodiments that utilize SS buffer 202 to alleviate performance degradations, such as due to small caches, SS buffer 202 may be physical placed in the unit that can minimize internal bus transfers and thus the additional dynamic power/energy overheads. For instance, if SSP 114 and SSP adder 416 are in the address generation unit 410 (as illustrated in FIGS. 4-6), SS buffer 202 may be logically placed in address generation unit 410 too in order to minimize power consumption.

Figure 7B:
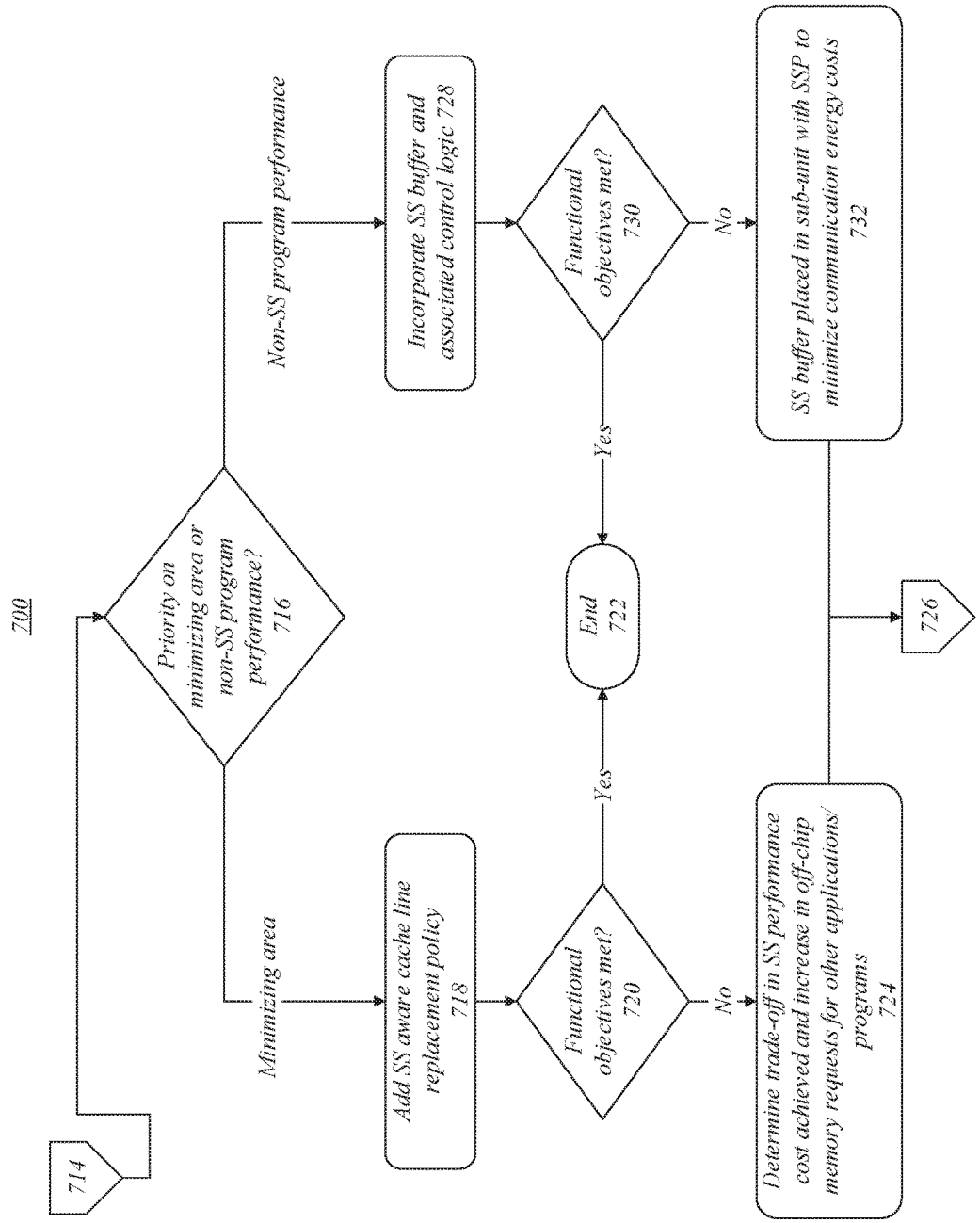
Figure 7C:
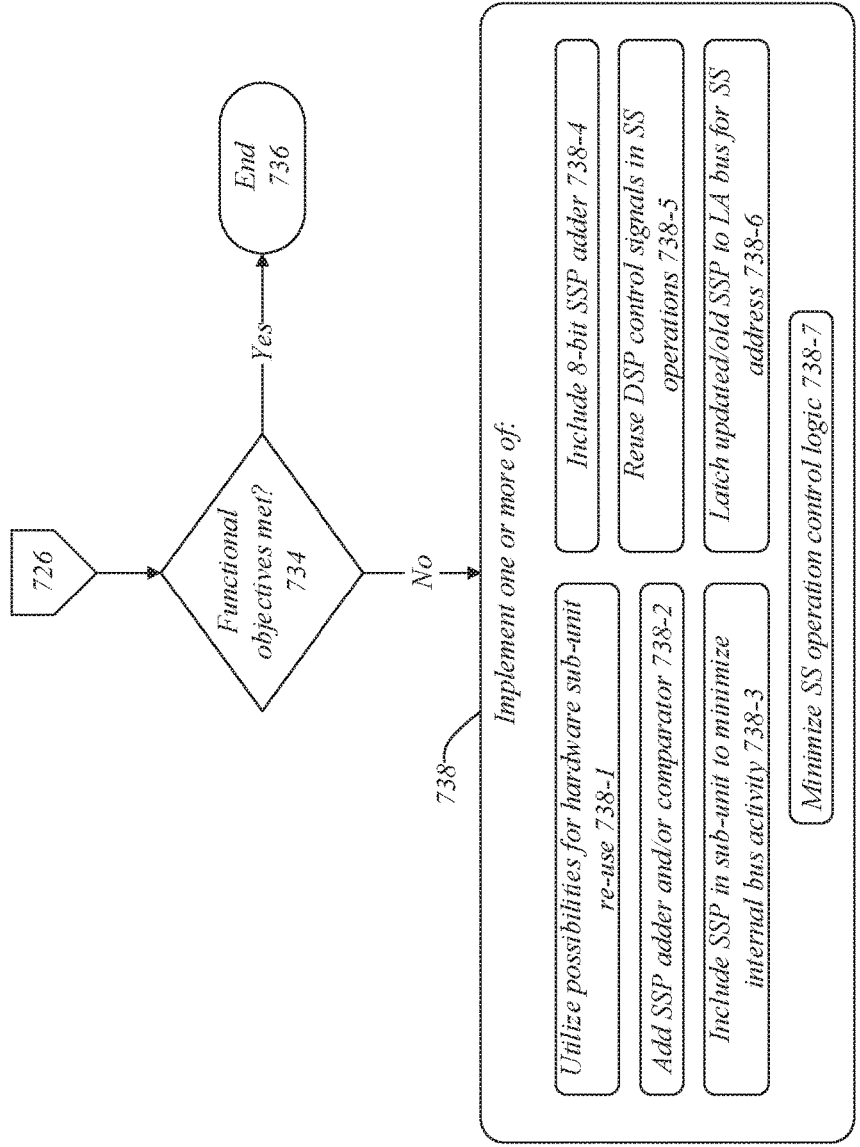

FIGS. 7A-7C illustrate one embodiment of a logic flow 700, which may be representative different micro-architectural approaches for performance optimization of SS implementations in computing platform 102. The logic flow 700 may be representative of some or all of the factors in determining one or more optimizations to implement in computing platform 102. The embodiments are not limited in this context.

In the illustrated embodiment shown in FIG. 7, the logic flow 700 may begin at block 702. At block 702 "overlap shadow stack (SS) and SS pointer (SSP) operations with data stack (DS) read/write operations" SS access operations may be overlapped with DS access operations. For example, computing platform 102 may overlap calculation of a next SSP value and consequent update with DS read/write operations. Proceeding to block 704 "initiate branch instruction calculation in pre-fetcher early in RET instruction" a branch instruction calculation may be initiated in a pre-fetcher early in a RET instruction. For example, on RETs, a branch cycle memory request may be initiated prior to the comparison between DS and SS return addresses. In some embodiments, instruction fetch unit 424 may include the pre-fetcher.

At block 706 "small cache?" it may be determined whether the cache is small. For instance, the cache may be small when it is less than 8 KB. In other instances, the cache may be small when it is less than or equal to 8 KB. In various embodiments, a cache may be small when a cache line is unable to handle the maximum function call depth for a majority of scenarios. In some embodiments, cache memory 106 may include the cache. If the cache is not small, logic flow 700 may proceed to block 708. At block 708 "functional objectives met?" it may be determined if all functional objectives are met. For instance, it may be determined if all functional objectives for computing platform 102 are met for a specific use case. In various embodiments, functional objectives may include one or more performance, power, and/or area targets. If all the functional objectives are met, logic flow 700 may end at block 710. If all the functional objectives are not met, logic flow 700 may proceed to block 712.

At block 712, one or more options may be identified for implementation in order to meet functional objectives. In the illustrated embodiments, this may include one or more of "utilize possibilities for hardware sub-unit re-use 712-1", "add SSP adder and/or comparator 712-2", include SSP in sub-unit to minimize internal bus activity 712-3", "include 8-bit SSP adder 712-4", "reuse DSP control signals in SS operations 712-5", latch updated/old SSP to LA bus for SS address 712-6", or "minimize SS operation control logic 712-7". Referring back to block 706 "small cache?", if the cache is small, logic flow 700 may proceed to block 714. At block 714, logic flow 700 proceeds to FIG. 7B.

Continuing to block 716 "priority on minimizing area or non-SS program performance?" it may be determined whether emphasis is placed on minimizing are or non-SS program performance. For instance, it may be determined whether the area utilized by computing platform 102 is more or less important that the performance of non-SS programs on computing platform 102. If minimizing area is more important, logic flow 700 may proceed to block 718. At block 718 "add SS aware cache line replacement policy" an SS aware cache line replacement policy may be added. For instance, SS aware cache line replacement policy 604 may be implemented in computing platform 102.

Proceeding to block 720 "functional objectives met?" it may be determined if all functional objectives are met. For instance, it may be determined if all functional objectives for computing platform 102 are met for a specific use case. In various embodiments, functional objectives may include one or more performance, power, and/or area targets. If all the functional objectives are met, logic flow 700 may end at block 722. If all the functional objectives are not met, logic flow 700 may proceed to block 724. At block 724 "determine trade-off in SS performance cost achieved and increase in off-chip memory requests for other applications/programs" a balance between SS performance and off-chip memory requests for other applications/programs may be determined. Once a balance is reached, logic flow 700 may proceed to block 726.

Referring back to block 716, if non-SS program performance is more important, logic flow 700 may proceed to block 728. At block 728 "incorporate SS buffer and associated control logic" an SS buffer and required control logic may be implemented. For instance, SS buffer 202 along with control logic 502 may be implemented in computing platform 102. Proceeding to block 730 "functional objectives met?" it may be determined if all functional objectives are met. For instance, it may be determined if all functional objectives for computing platform 102 are met for a specific use case. In various embodiments, functional objectives may include one or more performance, power, and/or area targets. If all the functional objectives are met, logic flow 700 may end at block 722. If all the functional objectives are not met, logic flow 700 may proceed to block 732. At block 732 "SS buffer placed in sub-unit with SSP to minimize communication energy costs" the SS buffer may be placed in a sub-unit along with SSP to limit internal bus transfers. For instances, SS buffer 202 may be placed in address generation unit 410 along with SSP 114. Next, logic flow may proceed to block 726. At block 726, logic flow 700 proceeds to FIG. 7C.

Continuing to block 734 "functional objectives met?" it may be determined if all functional objectives are met. For instance, it may be determined if all functional objectives for computing platform 102 are met for a specific use case. In various embodiments, functional objectives may include one or more performance, power, and/or area targets. If all the functional objectives are met, logic flow 700 may end at block 736. If all the functional objectives are not met, logic flow 700 may proceed to block 738. At block 738, one or more options may be identified for implementation to meet functional objectives. In the illustrated embodiments, this may include the same options discussed with respect to block 712.

FIG. 8 illustrates one embodiment of a logic flow 800, which may be representative of operations that may be executed in various embodiments in conjunctions with providing control flow protection. The logic flow 800 may be representative of some or all the operations that may be executed by one or more components of operating environments 100, 200, 300, 400, 500, or 600 of FIGS. 1-6, such as computing platform 102. The embodiments are not limited in this context.

In the illustrated embodiment shown in FIG. 8, the logic flow 800 may begin at block 802. At block 802 "write a return address onto a data stack (DS) at a location identified by a DS pointer (DSP) value within a first instruction execution cycle and in response to a call instruction (CALL)" a return address may be written onto a DS at a location identified by a DSP within a first instruction execution cycle and in response to a CALL. For example, return address 308-1 may be written onto DS 110 at a location identified by DSP 118 within a first instruction execution cycle.

Continuing to block 804 "calculate a shadow stack (SS) memory address based on an SS pointer (SSP) value within the first instruction execution cycle and in response to the CALL" an SS memory address may be calculated based on an SSP value within the first instruction execution cycle and in response to the CALL. For example, an address on SS 108 may be calculated to store the return address. In some embodiments, the SS memory address may be pointed to or identified by SSP 114. Continuing to block 806 "write the return address onto the SS at the SS memory address generated within the first instruction execution cycle within a second instruction execution cycle and in response to the CALL" the return address may be written onto a SS at the SS memory address generated within the first instruction execution cycle within a second instruction execution cycle. For example, return address 314 may be written onto SS 108 at a location identified by SSP 114 within a second instruction execution cycle. In various embodiments, return addresses 308-1, 314 may be equivalent when they are written onto DS 110 and SS 108, respectively.

FIG. 9 illustrates one embodiment of a logic flow 900, which may be representative of operations that may be executed in various embodiments in conjunctions with providing control flow protection. The logic flow 900 may be representative of some or all the operations that may be executed by one or more components of operating environments 100, 200, 300, 400, 500, or 600 of FIGS. 1-6, such as computing platform 102. The embodiments are not limited in this context.

In the illustrated embodiment shown in FIG. 9, the logic flow 900 may begin at block 902. At block 902 "read a first return address from a data stack (DS) at a location identified by a DS pointer (DSP) value within a first instruction execution cycle and in response to a return instruction (RET)" a first return address may be read from DS at a location identified by a DSP value within a first instruction execution cycle and in response to a RET. For example, return address 308-1 may be read from DS 110 at a location identified by DSP 118 within a first instruction execution cycle. Continuing to block 904 "calculate a shadow stack (SS) memory address based on an SS pointer (SSP) value within the first instruction execution cycle and in response to the RET" an SS memory address may be calculated based on an SSP value within the first instruction execution cycle and in response to the RET. For example, an address on SS 108 may be calculated to read a return address from. In some embodiments, the SS memory address may be pointed to or identified by SSP 114.

Continuing to block 906 "read a second return address from the SS at the SS memory address generated within the first instruction execution cycle within a second instruction execution cycle and in response to the RET" a second return address may be read from the SS at the SS memory address generated within the first instruction execution cycle within a second instruction execution cycle and in response to the RET. For example, return address 314 may be read from SS 108 at a location identified by SSP 114 within a second instruction execution cycle. At block 908 "fetch an instruction from the first return address within the second instruction execution cycle" an instruction located at the first return address may be fetched within the second instruction execution cycle. In various embodiments, return addresses 308-1, 314 read from DS 110 and SS 108, respectively, may be compared in a subsequent instruction execution cycle to determine whether to execute the instruction or generate an exception. In various such embodiments, comparison of return addresses 308-1, 314 may serve to provide control flow protection. For instance, when return addresses 308-1, 314 do not match, by generating an exception, an attempt to hijack control flow may be prevented.

FIG. 10 illustrates an embodiment of a storage medium 900. Storage medium 900 may comprise any non-transitory computer-readable storage medium or machine-readable storage medium, such as an optical, magnetic or semiconductor storage medium. In various embodiments, storage medium 900 may comprise an article of manufacture. In some embodiments, storage medium 900 may store computer-executable instructions, such as computer-executable instructions to implement one or more of logic flows or operations described herein, such as with respect to logic flow 800 of FIG. 8 and logic flow 900 of FIG. 9. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 11:
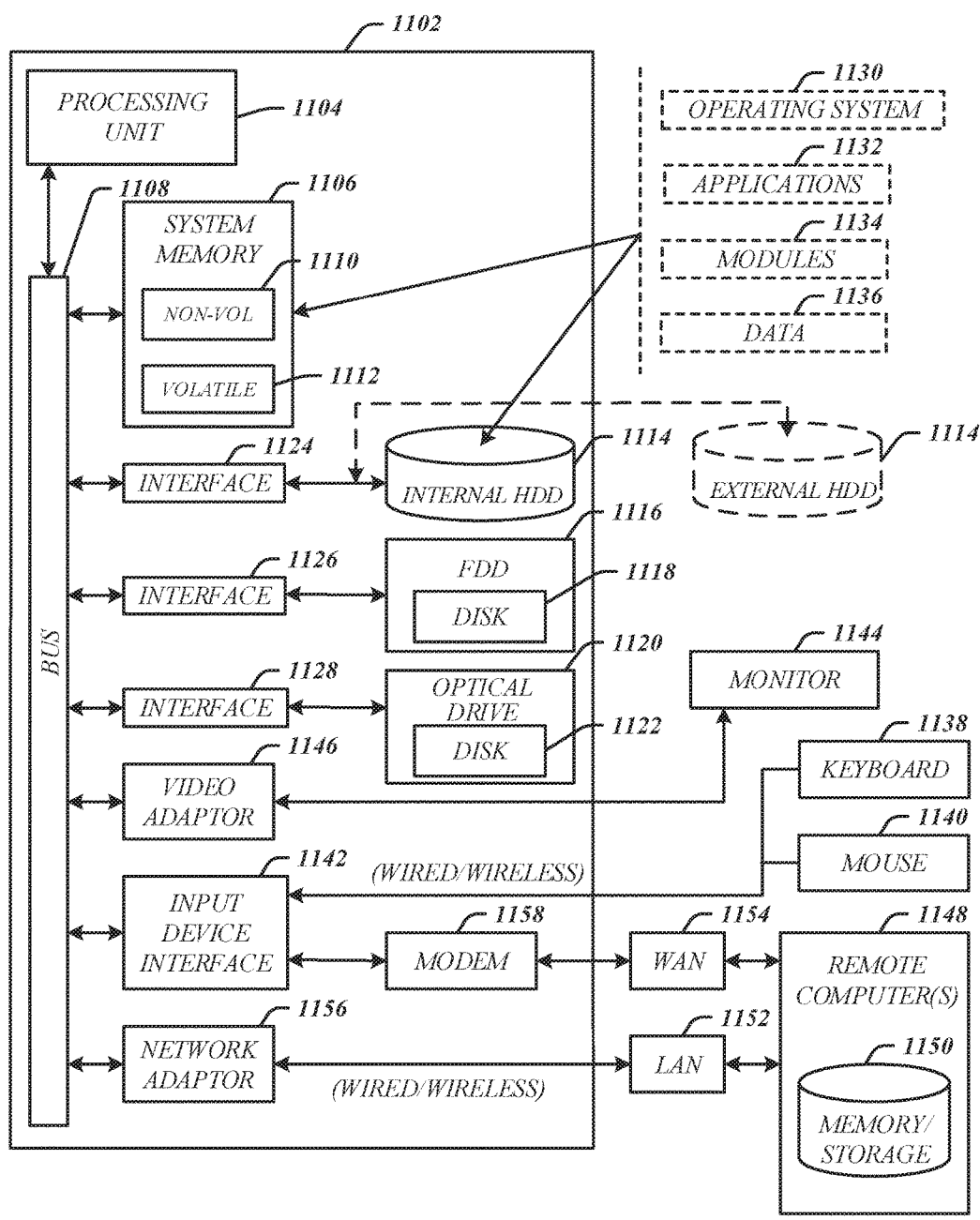
FIG. 11 illustrates an embodiment of a computing architecture.

FIG. 11 illustrates an embodiment of an exemplary computing architecture 1100 that may be suitable for implementing various embodiments as previously described. In various embodiments, the computing architecture 1100 may comprise or be implemented as part of an electronic device. In some embodiments, the computing architecture 1100 may be representative, for example, of a computer system that implements or utilizes one or more components of operating environments 100, 200, 300, 400, 500, or 600 of FIGS. 1-6. In some embodiments, computing architecture 1100 may be representative, for example, of one or more portions of computing platform 102 that implement or utilize one or more embodiments described herein. For instance, control logic main memory 120 may comprise one or more portions of system memory 1106 of computing architecture 1100. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. In some embodiments, system memory 1106 may include main memory. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and Institute of Electrical and Electronics Engineers (IEEE) 994 interface technologies. In various embodiments, these types of memory may not be included in main memory or system memory.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of computing platform 102, such as one or more portions of SS aware cache line replacement policy 604 or other programs operating on computing platform 102.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 994 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. In various embodiments, one or more migrations may occur via the networked environment. The remote computer 1148 can be a workstation, a server computer, a router, a personal computer, portable computer, microprocessor-based entertainment appliance, a peer device or other common network node, and typically includes many or all the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
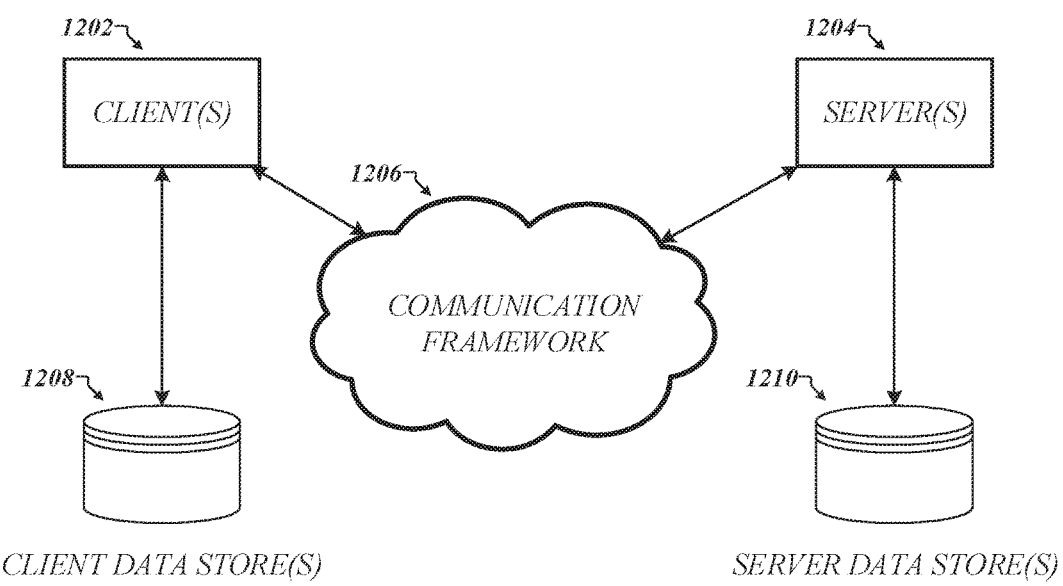
FIG. 12 illustrates an embodiment of a communications architecture.

FIG. 12 illustrates a block diagram of an exemplary communications architecture 1200 suitable for implementing various embodiments as previously described, such as virtual machine migration. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1202 and servers 1204. The clients 1202 and the servers 1204 are operatively connected to one or more respective client data stores 1208 and server data stores 1210 that can be employed to store information local to the respective clients 1202 and servers 1204, such as cookies and/or associated contextual information. In various embodiments, any one of servers 1204 may implement one or more of logic flows or operations described herein, and storage medium 1000 of FIG. 10 in conjunction with storage of data received from any one of clients 1202 on any of server data stores 1210.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments, from which numerous permutations and configurations will be apparent.

Example 1 is an apparatus for control flow protection, the apparatus comprising: a memory; and logic for a computing platform, at least a portion of the logic implemented in circuitry coupled to the memory, the logic to: write a return address onto a data stack (DS) at a location identified by a DS pointer (DSP) value within a first instruction execution cycle and in response to a call instruction (CALL); calculate a shadow stack (SS) memory address based on an SS pointer (SSP) value within the first instruction execution cycle and in response to the CALL; and write the return address onto the SS at the SS memory address calculated within the first instruction execution cycle within a second instruction execution cycle and in response to the CALL.

Example 2 includes the subject matter of Example 1, the first instruction execution cycle adjacent to the second instruction execution cycle.

Example 3 includes the subject matter of Example 1, calculation of the SS memory address comprising logic to calculate an updated SSP value within the first instruction execution cycle and in response to the CALL, the updated SSP value to identify the SS memory address to write the return address onto the SS.

Example 4 includes the subject matter of Example 3, the logic to utilize a DS control signal to calculate the updated SSP value.

Example 5 includes the subject matter of Example 3, calculation of the SS memory address comprising logic to send the updated SSP value to a latch communicatively coupled to a linear address bus within the first instruction execution cycle.

Example 6 includes the subject matter of Example 3, the logic to add or subtract a word length utilized by the computing platform from the SSP value to calculate the updated SSP value.

Example 7 includes the subject matter of Example 6, the logic to utilize dedicated hardware to add or subtract the word length.

Example 8 includes the subject matter of Example 7, the dedicated hardware comprising an 8-bit adder.

Example 9 includes the subject matter of Example 1, comprising a cache memory, the cache memory to store at least a portion of the SS and at least a portion of the DS.

Example 10 includes the subject matter of Example 9, the logic to implement an SS aware cache policy, the SS aware cache policy to select a cache memory address to cache out to main memory based at least in part on whether one or more portions of the SS is stored at the cache memory address to cache out.

Example 11 includes the subject matter of Example 10, the logic to determine whether one or more portions of the SS are stored at the cache memory address to cache out based on a bit in a page table entry (PTE) associated with the cache memory address to cache out.

Example 12 includes the subject matter of Example 1, comprising a page table with one or more page table entries (PTEs) associated with one or more portions of the SS, each of the one or more PTEs to include a bit to prevent normal load/store instructions from accessing the one or more portions of the SS.

Example 13 includes the subject matter of Example 1, comprising an SS buffer and a cache memory, the SS buffer to store at least a portion of the SS and the cache memory to store at least a portion of the DS.

Example 14 includes the subject matter of Example 1, the computing platform comprising an Internet of things (IoT) platform with a single memory request pipeline.

Example 15 is an apparatus for control flow protection, the apparatus comprising: a memory; and logic for a computing platform, at least a portion of the logic implemented in circuitry coupled to the memory, the logic to: read a first return address from a data stack (DS) at a location identified by a DS pointer (DSP) value within a first instruction execution cycle and in response to a return instruction (RET); calculate a shadow stack (SS) memory address based on an SS pointer (SSP) value within the first instruction execution cycle and in response to the RET; and read a second return address from the SS at the SS memory address generated within the first instruction execution cycle within a second instruction execution cycle and in response to the RET; and fetch an instruction from the first return address within the second instruction execution cycle and in response to the RET.

Example 16 includes the subject matter of Example 15, the logic to: compare the first return address to the second return address; and execute the instruction fetched from the first return address when the first return address matches the second return address.

Example 17 includes the subject matter of Example 16, the logic to utilize dedicated hardware to compare the first return address to the second return address.

Example 18 includes the subject matter of Example 15, the logic to: compare the first return address to the second return address; and generate an exception when the first return address differs from the second return address.

Example 19 includes the subject matter of Example 18, the logic to utilize dedicated hardware to compare the first return address to the second return address.

Example 20 includes the subject matter of Example 15, the first instruction execution cycle adjacent to the second instruction execution cycle.

Example 21 includes the subject matter of Example 15, calculation of the SS memory address comprising logic to send the SSP value to a latch communicatively coupled to a linear address bus within the instruction execution cycle, the SSP value to identify the SS memory address to read the return address from the SS.

Example 22 includes the subject matter of Example 21, the logic to calculate an updated SSP value within the first instruction execution cycle and in response to the RET, the updated SSP value to identify an updated top of the SS.

Example 23 includes the subject matter of Example 22, the logic to add or subtract a word length utilized by the computing platform from the SSP value to calculate the updated SSP value.

Example 24 includes the subject matter of Example 23, the logic to utilize dedicated hardware to add or subtract the word length.

Example 25 includes the subject matter of Example 24, the dedicated hardware comprising an 8-bit adder.

Example 26 includes the subject matter of Example 15, comprising a page table with one or more page table entries (PTEs) associated with one or more portions of the SS, each of the one or more PTEs to include a bit to prevent normal load/store instructions from accessing the one or more portions of the SS.

Example 27 includes the subject matter of Example 15, comprising an SS buffer and a cache memory, the SS buffer to store at least a portion of the SS and the cache memory to store at least a portion of the DS.

Example 28 includes the subject matter of Example 15, the computing platform comprising an internet of things (IoT) platform with a single memory request pipeline.

Example 29 includes the subject matter of Example 15, comprising an SSP register to store the SSP value and a DSP register to store the DSP value.

Example 30 is at least one computer-readable medium comprising a set of instructions that, in response to being executed by a processor circuit, cause the processor circuit to: write a return address onto a data stack (DS) at a location identified by a DS pointer (DSP) value within a first instruction execution cycle and in response to a call instruction (CALL); calculate a shadow stack (SS) memory address based on an SS pointer (SSP) value within the first instruction execution cycle and in response to the CALL; and write the return address onto the SS at the SS memory address calculated within the first instruction execution cycle within a second instruction execution cycle and in response to the CALL.

Example 31 includes the subject matter of Example 30, the first instruction execution cycle adjacent to the second instruction execution cycle.

Example 32 includes the subject matter of Example 30, calculation of the SS memory address comprising instructions to calculate an updated SSP value within the first instruction execution cycle and in response to the CALL, the updated SSP value to identify the SS memory address to write the return address onto the SS.

Example 33 includes the subject matter of Example 32, comprising instructions that, in response to being executed by the processor circuit, cause the processor circuit to utilize dedicated hardware to utilize a DS control signal to calculate the updated SSP value.

Example 34 includes the subject matter of Example 32, calculation of the SS memory address comprising instructions to send the updated SSP value to a latch communicatively coupled to a linear address bus within the first instruction execution cycle.

Example 35 includes the subject matter of Example 32, comprising instructions that, in response to being executed by the processor circuit, cause the processor circuit to utilize dedicated hardware to add or subtract a word length utilized by the computing platform from the SSP value to calculate the updated SSP value.

Example 36 includes the subject matter of Example 35, comprising instructions that, in response to being executed by the processor circuit, cause the processor circuit to utilize dedicated hardware to utilize dedicated hardware to add or subtract the word length.

Example 37 includes the subject matter of Example 36, the dedicated hardware comprising an 8-bit adder.

Example 38 includes the subject matter of Example 30, comprising a cache memory, the cache memory to store at least a portion of the SS and at least a portion of the DS.

Example 39 includes the subject matter of Example 38, comprising instructions that, in response to being executed by the processor circuit, cause the processor circuit to utilize dedicated hardware to implement an SS aware cache policy, the SS aware cache policy to select a cache memory address to cache out to main memory based at least in part on whether one or more portions of the SS is stored at the cache memory address to cache out.

Example 40 includes the subject matter of Example 39, comprising instructions that, in response to being executed by the processor circuit, cause the processor circuit to utilize dedicated hardware to determine whether one or more portions of the SS are stored at the cache memory address to cache out based on a bit in a page table entry (PTE) associated with the cache memory address to cache out.

Example 41 includes the subject matter of Example 30, comprising a page table with one or more page table entries (PTEs) associated with one or more portions of the SS, each of the one or more PTEs to include a bit to prevent normal load/store instructions from accessing the one or more portions of the SS.

Example 42 includes the subject matter of Example 30, comprising an SS buffer and a cache memory, the SS buffer to store at least a portion of the SS and the cache memory to store at least a portion of the DS.

Example 43 includes the subject matter of Example 30, the computing platform comprising an internet of things (IoT) platform with a single memory request pipeline.

Example 44 is at least one computer-readable medium comprising a set of instructions that, in response to being executed by a processor circuit, cause the processor circuit to: read a first return address from a data stack (DS) at a location identified by a DS pointer (DSP) value within a first instruction execution cycle and in response to a return instruction (RET); calculate a shadow stack (SS) memory address based on an SS pointer (SSP) value within the first instruction execution cycle and in response to the RET; and read a second return address from the SS at the SS memory address generated within the first instruction execution cycle within a second instruction execution cycle and in response to the RET; and fetch an instruction from the first return address within the second instruction execution cycle and in response to the RET.

Example 45 includes the subject matter of Example 44, comprising instructions that, in response to being executed by the processor circuit, cause the processor circuit to: compare the first return address to the second return address; execute the instruction fetched from the first return address when the first return address matches the second return address.

Example 46 includes the subject matter of Example 45, comprising instructions that, in response to being executed by the processor circuit, cause the processor circuit to utilize dedicated hardware to compare the first return address to the second return address.

Example 47 includes the subject matter of Example 44, comprising instructions that, in response to being executed by the processor circuit, cause the processor circuit to: compare the first return address to the second return address; and generate an exception when the first return address differs from the second return address.

Example 48 includes the subject matter of Example 47, comprising instructions that, in response to being executed by the processor circuit, cause the processor circuit to utilize dedicated hardware to compare the first return address to the second return address.

Example 49 includes the subject matter of Example 44, the first instruction execution cycle adjacent to the second instruction execution cycle.

Example 50 includes the subject matter of Example 44, calculation of the SS memory address comprising instructions to send the SSP value to a latch communicatively coupled to a linear address bus within the instruction execution cycle, the SSP value to identify the SS memory address to read the return address from the SS.

Example 51 includes the subject matter of Example 50, comprising instructions that, in response to being executed by the processor circuit, cause the processor circuit to calculate an updated SSP value within the first instruction execution cycle and in response to the RET, the updated SSP value to identify an updated top of the SS.

Example 52 includes the subject matter of Example 51, comprising instructions that, in response to being executed by the processor circuit, cause the processor circuit to add or subtract a word length utilized by the computing platform from the SSP value to calculate the updated SSP value.

Example 53 includes the subject matter of Example 52, comprising instructions that, in response to being executed by the processor circuit, cause the processor circuit to utilize dedicated hardware to add or subtract the word length.

Example 54 includes the subject matter of Example 53, the dedicated hardware comprising an 8-bit adder.

Example 55 includes the subject matter of Example 44, comprising a page table with one or more page table entries (PTEs) associated with one or more portions of the SS, each of the one or more PTEs to include a bit to prevent normal load/store instructions from accessing the one or more portions of the SS.

Example 56 includes the subject matter of Example 44, comprising an SS buffer and a cache memory, the SS buffer to store at least a portion of the SS and the cache memory to store at least a portion of the DS.

Example 57 includes the subject matter of Example 44, the computing platform comprising an internet of things (IoT) platform with a single memory request pipeline.

Example 58 includes the subject matter of Example 44, comprising an SSP register to store the SSP value and a DSP register to store the DSP value.

Example 59 is a computer-implemented method, comprising: writing a return address onto a data stack (DS) at a location identified by a DS pointer (DSP) value within a first instruction execution cycle and in response to a call instruction (CALL); calculating a shadow stack (SS) memory address based on an SS pointer (SSP) value within the first instruction execution cycle and in response to the CALL; and writing the return address onto the SS at the SS memory address calculated within the first instruction execution cycle within a second instruction execution cycle and in response to the CALL.

Example 60 includes the subject matter of Example 59, the first instruction execution cycle adjacent to the second instruction execution cycle.

Example 61 includes the subject matter of Example 59, comprising calculating the SS memory address comprising calculating an updated SSP value within the first instruction execution cycle and in response to the CALL, the updated SSP value to identify the SS memory address to write the return address onto the SS.

Example 62 includes the subject matter of Example 61, comprising utilizing a DS control signal to calculate the updated SSP value.

Example 63 includes the subject matter of Example 61, comprising calculating the SS memory address comprising sending the updated SSP value to a latch communicatively coupled to a linear address bus within the first instruction execution cycle.

Example 64 includes the subject matter of Example 61, comprising adding or subtracting a word length utilized by the computing platform from the SSP value to calculate the updated SSP value.

Example 65 includes the subject matter of Example 64, comprising utilizing dedicated hardware to add or subtract the word length.

Example 66 includes the subject matter of Example 65, the dedicated hardware comprising an 8-bit adder.

Example 67 includes the subject matter of Example 59, comprising a cache memory, the cache memory to store at least a portion of the SS and at least a portion of the DS.

Example 68 includes the subject matter of Example 67, comprising implementing an SS aware cache policy, the SS aware cache policy to select a cache memory address to cache out to main memory based at least in part on whether one or more portions of the SS is stored at the cache memory address to cache out.

Example 69 includes the subject matter of Example 68, comprising determining whether one or more portions of the SS are stored at the cache memory address to cache out based on a bit in a page table entry (PTE) associated with the cache memory address to cache out.

Example 70 includes the subject matter of Example 59, comprising a page table with one or more page table entries (PTEs) associated with one or more portions of the SS, each of the one or more PTEs to include a bit to prevent normal load/store instructions from accessing the one or more portions of the SS.

Example 71 includes the subject matter of Example 59, comprising an SS buffer and a cache memory, the SS buffer to store at least a portion of the SS and the cache memory to store at least a portion of the DS.

Example 72 includes the subject matter of Example 59, the computing platform comprising an internet of things (IoT) platform with a single memory request pipeline.

Example 73 is a computer-implemented method, comprising: reading a first return address from a data stack (DS) at a location identified by a DS pointer (DSP) value within a first instruction execution cycle and in response to a return instruction (RET); calculating a shadow stack (SS) memory address based on an SS pointer (SSP) value within the first instruction execution cycle and in response to the RET; and reading a second return address from the SS at the SS memory address generated within the first instruction execution cycle within a second instruction execution cycle and in response to the RET; and fetching an instruction from the first return address within the second instruction execution cycle and in response to the RET.

Example 74 includes the subject matter of Example 73, comprising: comparing the first return address to the second return address; executing the instruction fetched from the first return address when the first return address matches the second return address.

Example 75 includes the subject matter of Example 74, comprising utilizing dedicated hardware to compare the first return address to the second return address.

Example 76 includes the subject matter of Example 73, comprising: comparing the first return address to the second return address; and generating an exception when the first return address differs from the second return address.

Example 77 includes the subject matter of Example 76, comprising utilizing dedicated hardware to compare the first return address to the second return address.

Example 78 includes the subject matter of Example 73, the first instruction execution cycle adjacent to the second instruction execution cycle.

Example 79 includes the subject matter of Example 73, comprising calculating the SS memory address comprising sending the SSP value to a latch communicatively coupled to a linear address bus within the instruction execution cycle, the SSP value to identify the SS memory address to read the return address from the SS.

Example 80 includes the subject matter of Example 79, comprising calculating an updated SSP value within the first instruction execution cycle and in response to the RET, the updated SSP value to identify an updated top of the SS.

Example 81 includes the subject matter of Example 80, comprising adding or subtracting a word length utilized by the computing platform from the SSP value to calculate the updated SSP value.

Example 82 includes the subject matter of Example 81, comprising utilizing dedicated hardware to add or subtract the word length.

Example 83 includes the subject matter of Example 82, the dedicated hardware comprising an 8-bit adder.

Example 84 includes the subject matter of Example 73, comprising a page table with one or more page table entries (PTEs) associated with one or more portions of the SS, each of the one or more PTEs to include a bit to prevent normal load/store instructions from accessing the one or more portions of the SS.

Example 85 includes the subject matter of Example 73, comprising an SS buffer and a cache memory, the SS buffer to store at least a portion of the SS and the cache memory to store at least a portion of the DS.

Example 86 includes the subject matter of Example 73, the computing platform comprising an internet of things (IoT) platform with a single memory request pipeline.

Example 87 includes the subject matter of Example 73, comprising an SSP register to store the SSP value and a DSP register to store the DSP value.

Example 88 is an apparatus for control flow protection, the apparatus comprising: means for writing a return address onto a data stack (DS) at a location identified by a DS pointer (DSP) value within a first instruction execution cycle and in response to a call instruction (CALL); means for calculating a shadow stack (SS) memory address based on an SS pointer (SSP) value within the first instruction execution cycle and in response to the CALL; and means for writing the return address onto the SS at the SS memory address calculated within the first instruction execution cycle within a second instruction execution cycle and in response to the CALL.

Example 89 includes the subject matter of Example 88, the first instruction execution cycle adjacent to the second instruction execution cycle.

Example 90 includes the subject matter of Example 88, comprising means for calculating the SS memory address comprising calculating an updated SSP value within the first instruction execution cycle and in response to the CALL, the updated SSP value to identify the SS memory address to write the return address onto the SS.

Example 91 includes the subject matter of Example 90, comprising means for utilizing a DS control signal to calculate the updated SSP value.

Example 92 includes the subject matter of Example 90, comprising means for calculating the SS memory address comprising sending the updated SSP value to a latch communicatively coupled to a linear address bus within the first instruction execution cycle.

Example 93 includes the subject matter of Example 90, comprising means for adding or subtracting a word length utilized by the computing platform from the SSP value to calculate the updated SSP value.

Example 94 includes the subject matter of Example 93, comprising means for utilizing dedicated hardware to add or subtract the word length.

Example 95 includes the subject matter of Example 94, the dedicated hardware comprising an 8-bit adder.

Example 96 includes the subject matter of Example 88, comprising means for a cache memory, the cache memory to store at least a portion of the SS and at least a portion of the DS.

Example 97 includes the subject matter of Example 96, comprising means for implementing an SS aware cache policy, the SS aware cache policy to select a cache memory address to cache out to main memory based at least in part on whether one or more portions of the SS is stored at the cache memory address to cache out.

Example 98 includes the subject matter of Example 97, comprising means for determining whether one or more portions of the SS are stored at the cache memory address to cache out based on a bit in a page table entry (PTE) associated with the cache memory address to cache out.

Example 99 includes the subject matter of Example 88, comprising means for a page table with one or more page table entries (PTEs) associated with one or more portions of the SS, each of the one or more PTEs to include a bit to prevent normal load/store instructions from accessing the one or more portions of the SS.

Example 100 includes the subject matter of Example 88, comprising means for an SS buffer and a cache memory, the SS buffer to store at least a portion of the SS and the cache memory to store at least a portion of the DS.

Example 101 includes the subject matter of Example 88, the computing platform comprising an Internet of things (IoT) platform with a single memory request pipeline.

Example 102 is an apparatus for control flow protection, the apparatus comprising: means for reading a first return address from a data stack (DS) at a location identified by a DS pointer (DSP) value within a first instruction execution cycle and in response to a return instruction (RET); means for calculating a shadow stack (SS) memory address based on an SS pointer (SSP) value within the first instruction execution cycle and in response to the RET; and means for reading a second return address from the SS at the SS memory address generated within the first instruction execution cycle within a second instruction execution cycle and in response to the RET; and means for fetching an instruction from the first return address within the second instruction execution cycle and in response to the RET.

Example 103 includes the subject matter of Example 102, comprising: means for comparing the first return address to the second return address; means for executing the instruction fetched from the first return address when the first return address matches the second return address.

Example 104 includes the subject matter of Example 103, comprising means for utilizing dedicated hardware to compare the first return address to the second return address.

Example 105 includes the subject matter of Example 102, comprising:
means for comparing the first return address to the second return address; and
means for generating an exception when the first return address differs from the second return address.

Example 106 includes the subject matter of Example 105, comprising means for utilizing dedicated hardware to compare the first return address to the second return address.

Example 107 includes the subject matter of Example 102, the first instruction execution cycle adjacent to the second instruction execution cycle.

Example 108 includes the subject matter of Example 102, comprising means for calculating the SS memory address comprising sending the SSP value to a latch communicatively coupled to a linear address bus within the instruction execution cycle, the SSP value to identify the SS memory address to read the return address from the SS.

Example 109 includes the subject matter of Example 108, comprising means for calculating an updated SSP value within the first instruction execution cycle and in response to the RET, the updated SSP value to identify an updated top of the SS.

Example 110 includes the subject matter of Example 109, comprising means for adding or subtracting a word length utilized by the computing platform from the SSP value to calculate the updated SSP value.

Example 111 includes the subject matter of Example 110, comprising means for utilizing dedicated hardware to add or subtract the word length.

Example 112 includes the subject matter of Example 111, the dedicated hardware comprising an 8-bit adder.

Example 113 includes the subject matter of Example 102, comprising means for a page table with one or more page table entries (PTEs) associated with one or more portions of the SS, each of the one or more PTEs to include a bit to prevent normal load/store instructions from accessing the one or more portions of the SS.

Example 114 includes the subject matter of Example 102, comprising means for an SS buffer and a cache memory, the SS buffer to store at least a portion of the SS and the cache memory to store at least a portion of the DS.

Example 115 includes the subject matter of Example 102, the computing platform comprising an internet of things (IoT) platform with a single memory request pipeline.

Example 116 includes the subject matter of Example 102, comprising means for an SSP register to store the SSP value and a DSP register to store the DSP value.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. An apparatus, comprising:
   circuitry for a computing platform; and
   a memory coupled to the circuitry, the memory comprising instructions that when executed by the circuitry, cause the circuitry to;
   write a return address onto a data stack (DS) at a memory location identified by a DS pointer (DSP) value within a first instruction execution cycle and in response to a call instruction (CALL);
   calculate a shadow stack (SS) memory address based on an updated SS pointer (SSP) value within the first instruction execution cycle of said DS write and in response to the CALL; and
   write, responsive to the CALL, the return address onto the SS at the SS memory address that is calculated within the first instruction execution cycle of said DS write, within a second instruction execution cycle adjacent to the first instruction execution cycle upon a completion of said DS write.

2. The apparatus of claim 1, the memory comprising instructions that when executed by the circuitry, cause the circuitry to calculate the updated SSP value within the first instruction execution cycle and in response to the CALL, the updated SSP value to identify the SS memory address to write the return address onto the SS.

3. The apparatus of claim 2, the memory comprising instructions that when executed by the circuitry, cause the circuitry to utilize a DS control signal to calculate the updated SSP value.

4. The apparatus of claim 2, the memory comprising instructions that when executed by the circuitry, cause the circuitry to send the updated SSP value to a latch communicatively coupled to a linear address bus within the first instruction execution cycle.

5. The apparatus of claim 2, the memory comprising instructions that when executed by the circuitry, cause the circuitry to add or subtract a word length utilized by the computing platform from the SSP value to calculate the updated SSP value.

6. The apparatus of claim 5, the memory comprising instructions that when executed by the circuitry, cause the circuitry to utilize dedicated hardware to add or subtract the word length.

7. The apparatus of claim 6, the dedicated hardware comprising an 8-bit adder.

8. The apparatus of claim 1, comprising a cache memory, the cache memory to store at least a portion of the SS and at least a portion of the DS.

9. The apparatus of claim 8, the memory comprising instructions that when executed by the circuitry, cause the circuitry to implement an SS aware cache policy, the SS aware cache policy to select a cache memory address to cache out to main memory based at least in part on whether one or more portions of the SS is stored at the cache memory address to cache out.

10. The apparatus of claim 9, the memory comprising instructions that when executed by the circuitry, cause the circuitry to determine whether one or more portions of the SS are stored at the cache memory address to cache out based on a bit in a page table entry (PTE) associated with the cache memory address to cache out.

11. The apparatus of claim 1, comprising a page table with one or more page table entries (PTEs) associated with one or more portions of the SS, each of the one or more PTEs to include a bit to prevent normal load/store instructions from accessing the one or more portions of the SS.

12. The apparatus of claim 1, comprising an SS buffer and a cache memory, the SS buffer to store at least a portion of the SS and the cache memory to store at least a portion of the DS.

13. The apparatus of claim 1, the computing platform comprising an internet of things (IoT) platform with a single memory request pipeline.

14. At least one non-transitory computer-readable storage medium comprising a set of instructions that, in response to being executed by a processor circuit, cause the processor circuit to:
read a first return address from a data stack (DS) at a memory location identified by a DS pointer (DSP) value within a first instruction execution cycle and in response to a return instruction (RET);
calculate a shadow stack (SS) memory address based on an updated SS pointer (SSP) value within the first instruction execution cycle of said DS read and in response to the RET; and
read, responsive to the RET, a second return address from the SS at the SS memory address that is calculated within the first instruction execution cycle of said DS read, within a second instruction execution cycle adjacent to the first instruction execution cycle upon a completion of said DS read; and
fetch, responsive to the RET and reading the second return address form the SS at the SS memory address, an instruction from the first return address within the second instruction execution cycle.

15. The at least one non-transitory computer-readable medium of claim 14, comprising instructions that, in response to being executed by the processor circuit, cause the processor circuit to:
compare the first return address to the second return address; and
execute the instruction fetched from the first return address when the first return address matches the second return address.

16. The at least one non-transitory computer-readable medium of claim 15, comprising instructions that, in response to being executed by the processor circuit, cause the processor circuit to utilize dedicated hardware to compare the first return address to the second return address.

17. The at least one non-transitory computer-readable medium of claim 14, comprising instructions that, in response to being executed by the processor circuit, cause the processor circuit to:
compare the first return address to the second return address; and
generate an exception when the first return address differs from the second return address.

18. The at least one non-transitory computer-readable medium of claim 17, comprising instructions that, in response to being executed by the processor circuit, cause the processor circuit to utilize dedicated hardware to compare the first return address to the second return address.

19. A computer-implemented method, comprising:
reading a first return address from a data stack (DS) at a memory location identified by a DS pointer (DSP) value within a first instruction execution cycle and in response to a return instruction (RET);
calculating a shadow stack (SS) memory address based on an updated SS pointer (SSP) value within the first instruction execution cycle of said DS read and in response to the RET; and
reading, responsive to the RET, a second return address from the SS at the SS memory address that is calculated within the first instruction execution cycle of said DS read, within a second instruction execution cycle adjacent to the first instruction execution cycle upon a completion of said DS read; and
fetching, responsive to the RET and reading the second return address from the SS at the SS memory address, an instruction from the first return address within the second instruction execution cycle.

20. The computer-implemented method of claim 19, calculating the SS memory address comprising sending the SSP value to a latch communicatively coupled to a linear address bus within the instruction execution cycle, the SSP value to identify the SS memory address to read the return address from the SS.

21. The computer-implemented method of claim 20, comprising calculating an updated SSP value within the first instruction execution cycle and in response to the RET, the updated SSP value to identify an updated top of the SS.

22. The computer-implemented method of claim 21, comprising adding or subtracting a word length from the SSP value to calculate the updated SSP value.

23. The computer-implemented method of claim 22, comprising utilizing dedicated hardware to add or subtract the word length.

\* \* \* \* \*

UNITED STATES PATENT AND TRADEMARK OFFICE
CERTIFICATE OF CORRECTION

PATENT NO. : 10,360,374 B2  
APPLICATION NO. : 15/605573  
DATED : July 23, 2019  
INVENTOR(S) : Abhishek Basak, Ravi L. Sahita and Vedvyas Shanbhogue Page 1 of 1

It is certified that error appears in the above-identified patent and that said Letters Patent is hereby corrected as shown below:

In the Claims

Column 32, Line 50, replace "cause the circuitry to;" with -- cause the circuitry to: --.

Column 34, Line 1, replace "execution cycle upon a completion" with -- execution cycle upon completion --.

Column 34, Line 5, replace "within the second instruction execution cycle" with -- within the second instruction execution cycle and in response to the RET --.

Column 34, Line 39, replace "instruction execution cycle" with -- instruction execution cycle of Said DS read --.

Column 34, Line 43, replace "execution cycle of said DS read" with -- execution cycle --.

Column 34, Line 49, replace "adjacent to the first instruction" with -- adjacent to the first instructional --.

Column 34, Line 49, replace "cycle upon a completion of said" with -- cycle upon completion of said --.

Signed and Sealed this  
Eighteenth Day of February, 2020

Andrei Iancu  
*Director of the United States Patent and Trademark Office*